(12) United States Patent
Haga et al.

(10) Patent No.: US 8,566,937 B2
(45) Date of Patent: Oct. 22, 2013

(54) INFORMATION PROCESSING APPARATUS AND METHOD FOR PREVENTING UNAUTHORIZED COOPERATION OF APPLICATIONS

(75) Inventors: Tomoyuki Haga, Nara (JP); Hideki Matsushima, Osaka (JP); Manabu Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/511,803

(22) PCT Filed: Sep. 26, 2011

(86) PCT No.: PCT/JP2011/005378
§ 371 (c)(1),
(2), (4) Date: May 24, 2012

(87) PCT Pub. No.: WO2012/046406
PCT Pub. Date: Apr. 12, 2012

(65) Prior Publication Data
US 2012/0291138 A1    Nov. 15, 2012

(30) Foreign Application Priority Data
Oct. 4, 2010    (JP) .................................. 2010-225232

(51) Int. Cl.
*G06F 21/00*    (2013.01)
(52) U.S. Cl.
USPC .............................................. 726/22; 726/26
(58) Field of Classification Search
USPC ............. 726/22, 26, 27, 29, 30; 713/189, 193
See application file for complete search history.

(56) References Cited

U.S. PATENT DOCUMENTS

| | | |
|---|---|---|
| 7,240,345 B2 | 7/2007 | Sueyoshi et al. |
| 7,752,668 B2 | 7/2010 | Omote et al. |

(Continued)

FOREIGN PATENT DOCUMENTS

| | | |
|---|---|---|
| EP | 1 669 854 | 12/2005 |
| JP | 2006-285983 | 10/2006 |

(Continued)

OTHER PUBLICATIONS

International Search Report issued Dec. 20, 2011 in corresponding International (PCT) Application No. PCT/JP2011/005378.

(Continued)

*Primary Examiner* — Edward Zee
(74) *Attorney, Agent, or Firm* — Wenderoth, Lind & Ponack, L.L.P.

(57) ABSTRACT

An information processing terminal (40) includes: a network control unit (250); an installation control unit (260); a process control unit (200) for starting up an application and establishing cooperation among applications including the application; an access-history map updating unit (290) for updating an access-history map (281) which represents history information on an access relationship among the applications when a request is made to start up the application or to establish cooperation among the applications; and an unauthorized-cooperation-of-applications control unit (220) for (i) determining whether or not an unauthorized cooperation, which is directed at sensitive information kept secret, is established among the applications with reference to information obtained from the access-history map (281) and an application authorizing list (271), and (ii) controlling execution of the application using an application execution control technique in the case where a result of the determination shows that the unauthorized cooperation is established.

14 Claims, 19 Drawing Sheets

(56) References Cited

U.S. PATENT DOCUMENTS

| | | |
|---|---|---|
| 8,141,057 B2 | 3/2012 | Sueyoshi et al. |
| 2004/0015948 A1 | 1/2004 | Sueyoshi et al. |
| 2006/0085857 A1* | 4/2006 | Omote et al. .................. 726/24 |
| 2006/0156380 A1 | 7/2006 | Gladstone et al. |
| 2006/0236392 A1 | 10/2006 | Thomas et al. |
| 2007/0288922 A1 | 12/2007 | Sueyoshi et al. |
| 2009/0077664 A1 | 3/2009 | Hsu et al. |
| 2010/0293615 A1 | 11/2010 | Ye |
| 2011/0239309 A1 | 9/2011 | Yanoo |

FOREIGN PATENT DOCUMENTS

| | | |
|---|---|---|
| JP | 2007-334536 | 12/2007 |
| JP | 2009-037545 | 2/2009 |
| JP | 4327698 | 9/2009 |
| WO | 02/065287 | 8/2002 |
| WO | 2006/074294 | 7/2006 |
| WO | 2009/049555 | 4/2009 |
| WO | 2010/067703 | 6/2010 |

OTHER PUBLICATIONS

Extended European Search Report issued Jul. 24, 2013 in corresponding European Application No. 11830340.3.

Heiko Mantel et al., "Using Information Flow Control to Evaluate Access Protection of Location Information in Mobile Communication Networks", Dec. 31, 2001, XP-002700006.

* cited by examiner

FIG. 6

| Application ID | Install path | Access authority setting | |
|---|---|---|---|
| | | Personal information | External network |
| A | /data/app/photoviewer.exe | Allowed | Denied |
| B | /data/app/game1.exe | Denied | Denied |
| C | /data/app/browser.exe | Denied | Allowed |
| D | /data/app/game2.exe | Denied | Denied |
| E | /data/app/game3.exe | Denied | Denied |

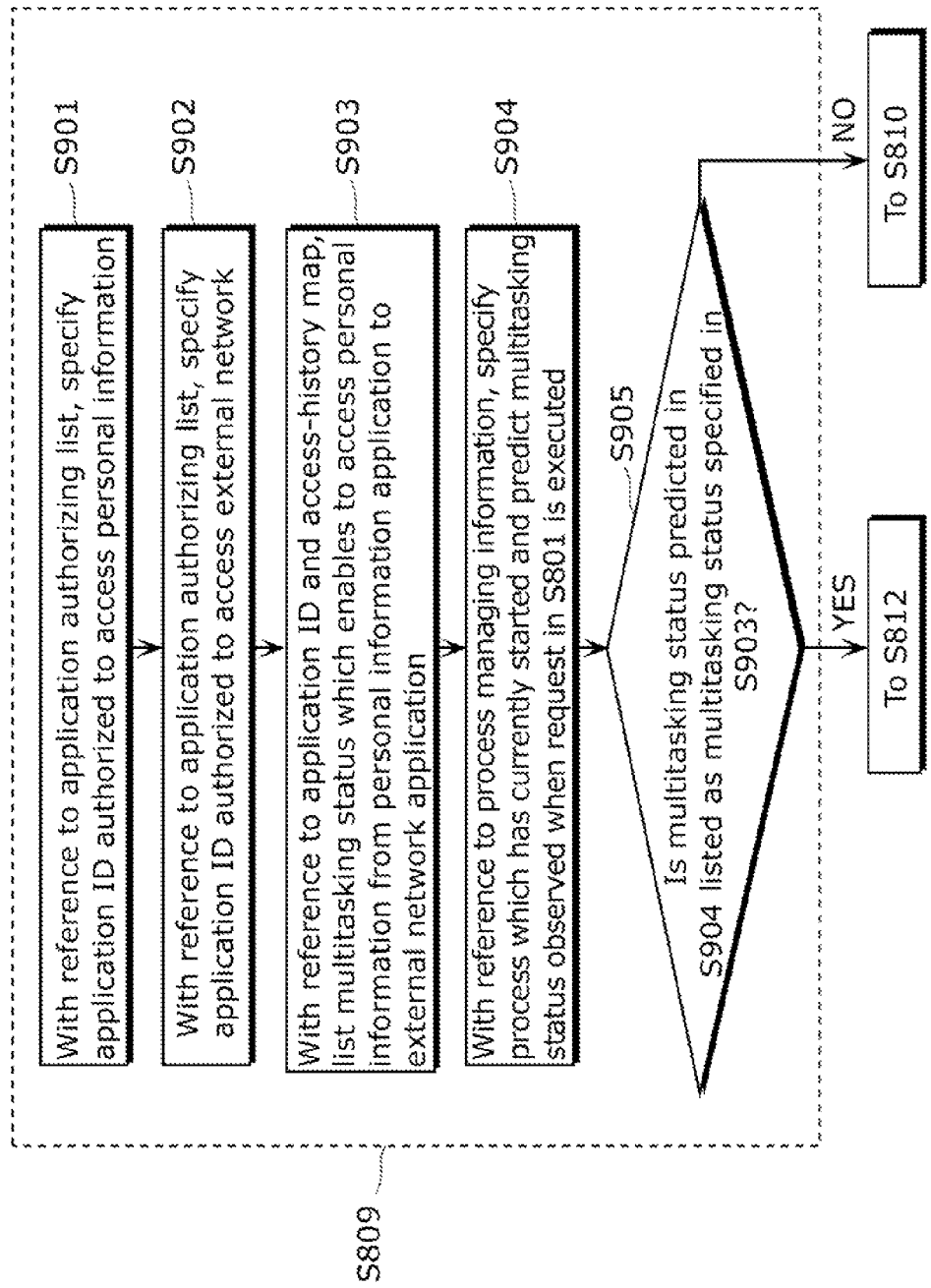

FIG. 11

| ON/OFF | Application behavior setting when determination shows unauthorized cooperation |
|---|---|
| ON | Requested application not started/Inter-process communication not established |
| OFF | External network forcefully disconnected |
| OFF | Application uninstalled |
| OFF | Executing application closed to create safe multitasking status with no risk of personal information leakage |

232 — 233 — 231

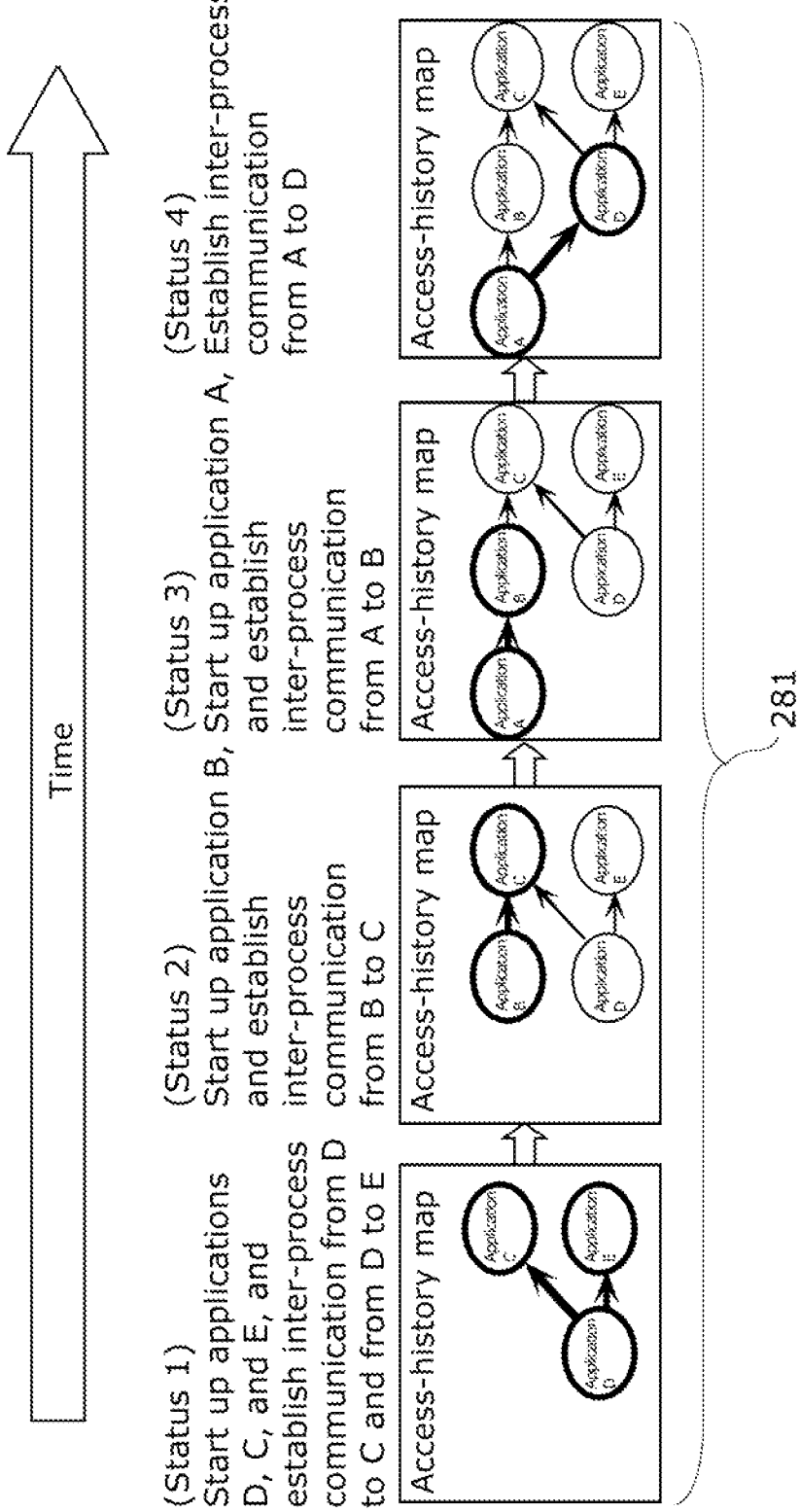

| 282 | 283 |
| --- | --- |
| Application ID | Accessed application ID |
| A | B, D |
| B | C |
| C | — |
| D | C, E |
| E | — |

INFORMATION PROCESSING APPARATUS AND METHOD FOR PREVENTING UNAUTHORIZED COOPERATION OF APPLICATIONS

TECHNICAL FIELD

The present invention relates to an information processing apparatus and a method for preventing an unauthorized cooperation of applications. The apparatus and the method prevent an unauthorized cooperation among multiple pieces of malware from leaking sensitive information, such as personal information, to outsiders.

BACKGROUND ART

Recent years have seen rapid gain in popularity of open-platform-based consumer equipment, such as smartphones. The open-platform environment for the current consumer equipment gives any user opportunities to develop applications, and to upload the developed applications to an application distribution site. Such applications uploaded to the application distribution site can be downloaded by unspecified users. The users install such applications to enhance the functions of their own terminals.

Moreover, the multitasking features of the terminals make it possible to simultaneously start up multiple applications. As a result, the users increasingly enjoy the benefits of the features, such as executing an application in the background and executing another application in the foreground, and cooperatively executing the applications.

Such a user terminal records personal information including an address book with e-mail addresses and phone numbers registered, password information, and photos. Consequently, more and more users are suffering when downloading the uploaded malware. Furthermore, the malware is becoming increasingly sophisticated. Some pieces of malware establish unauthorized cooperation with one another to execute unauthorized processing.

In general, most of the cooperative tasks among applications are not seen by the user. Thus, the cooperation among pieces of malware develops a potential risk of the leakage of the user's personal information to outsiders before he or she notices.

Assumed here, for example, is the case where there are three pieces of malware: malware A, malware B, and malware C, and the pieces establish an unauthorized cooperation one another. The malware A is an application to access a phone book, the malware B is a game application, and the malware C is an application to access an external communications network such as a browser.

A malware designer uploads the malware A, the malware B, and the malware C to the application distribution site as applications each of which does not execute unauthorized tasks alone, and runs normally. Then, the malware designer disguises each piece of malware as a legal application, and has a user gradually download all of the malware A, the malware B, and the malware C using various kinds of tricks.

On the other hand, the user identifies the malware A, the malware B, and the malware C as legal applications, and downloads the pieces of malware. Each of the malware A, the malware B, and the malware C does not execute unauthorized tasks as an individual application. Thus, without uninstalling the pieces of malware, the user continues using the malware pieces. Since the user terminal is also capable of multitasking, the following threat is considered: When the malware A, the malware B, and the malware C are started up on multitasking, the malware pieces run as malware for the first time, establish an unauthorized cooperation among themselves, and, through the external communications network, leak his or her personal information by unauthorized inter-process communication in the order by applications A, B, and C.

A technique disclosed in, for example, Patent Reference 1 has been proposed as a conventional countermeasure against malware. The technique disclosed in Patent Reference 1 (i) defines common behaviors among pieces of malware in a form of an unauthorized rule file, (ii) determines, without using the signature of the malware, whether or not communications by processes are established by malware, and (iii) stops the unauthorized process.

There is another technique disclosed in Patent Reference 2 as a conventional countermeasure against malware. The technique disclosed in Patent Reference 2 determines a dubious event as malware when the event satisfies a predetermined threshold, and executes control which is set as security setting in order to prevent the malware from spreading.

CITATION LIST

Patent Literature

[PTL 1]
Japanese Patent No. 4,327,698
[PTL 2]
Japanese Unexamined Patent Application Publication No. 2006-285983

SUMMARY OF INVENTION

Technical Problem

In the conventional technique disclosed in Patent Reference 1, unfortunately, the unauthorized rule file is fixed information. On a terminal in which applications are installed, the user inevitably needs to obtain a new unauthorized rule file which corresponds to the downloaded applications, and update the old unauthorized rule file with the new one. Thus, the technique has the following problem: On the terminal in which applications are downloaded, it is impossible to detect an unauthorized cooperation executed by the downloaded applications unless an unauthorized rule file is obtained for update from a server.

In the conventional technique disclosed in Patent Reference 2, furthermore, the threshold information used for determining whether or not downloaded applications are malware is fixed information. Thus, the technique has a problem similar to that of the technique in Patent Reference 1: On a terminal in which applications are downloaded, it is impossible to detect an unauthorized cooperation executed by the downloaded applications unless new threshold information is obtained for update from a server.

The present invention is conceived in view of the above problems and has an object to provide an information processing apparatus and a method for preventing an unauthorized cooperation among applications. The apparatus and the method are capable of preventing unauthorized applications from cooperating one another and leaking sensitive information such as personal information, and such prevention is also directed at a newly installed application.

Solution to Problem

In order to solve the above problems, an information processing apparatus according to an aspect of the present invention includes: a network control unit which establishes a connection to an external communications network; an installation control unit which installs an application; a process control unit which starts up the application and establish cooperation among applications including the application; an access-history map updating unit which updates an access-history map which represents history information on an access relationship among the applications when a request is made to start up the application or to establish cooperation among the applications, so that the updated access-history map is a map when the requested startup is executed or when the requested cooperation is established; an unauthorized-cooperation-of-applications control unit which (i) determines whether or not an unauthorized cooperation, which is directed at sensitive information kept secret, is established among the applications with reference to information obtained from the access-history map and an application authorizing list which includes access authority information of the application, and (ii) controls execution of the application using an application execution control technique for the unauthorized cooperation, which is directed at the sensitive information, found among the applications in the case where a result of the determination shows that the unauthorized cooperation is established.

This structure successfully detects an unauthorized cooperation found among the applications and directed to the sensitive information, with reference to the application authorizing list and to the access-history map which represents history information on an access relationship among the applications. Moreover, the access-history map, referred for the determination to show whether or not an unauthorized cooperation is established, is updated when a request is made to start up an application in the information processing apparatus and to establish inter-process communication; that is cooperation among the applications. This operation eliminates the need of conventional update by a server of a pattern file of malware, and makes it possible to specify an unauthorized cooperation directed to a newly-downloaded application. Hence, for a newly-installed application, the information processing apparatus successfully prevents an unauthorized cooperation among applications which causes a leakage of sensitive information such as personal information.

Preferably, the unauthorized-cooperation-of-applications control unit determines whether or not the unauthorized cooperation is established, based on information obtained from the application authorizing list including access authority information representing an access right to personal information or confidential information.

This operation successfully detects an unauthorized cooperation found among applications and directed to personal information or confidential information.

Preferably, the unauthorized-cooperation-of-applications control unit determines whether or not the unauthorized cooperation is established, based on information obtained from the application authorizing list further including access authority information representing an access right to the external communications network.

This operation successfully detects an unauthorized cooperation which leaks sensitive information to an external communications network.

Preferably, the unauthorized-cooperation-of-applications control unit (i) determines whether or not the unauthorized cooperation, which causes a leakage of the sensitive information via the external communications network, is established among the applications, and (ii) controls execution of the applications based on control-of-application-execution setting information showing an application execution control technique which prevents the unauthorized-cooperation in the case where a result of the determination shows that the unauthorized cooperation is established.

This operation successfully prevents an unauthorized cooperation found among the applications and causing a leakage of sensitive information via an external communications network.

In the case where the determination result shows that the unauthorized cooperation is established, preferably, the unauthorized-cooperation-of-applications control unit avoids the requested starting up of the application, using the application execution control technique shown in the control-of-application-execution setting information, based on the control-of-application-execution setting information showing an application execution control technique which avoids starting up the application.

This operation successfully avoids starting up an application after an unauthorized cooperation among the applications is specified, which contributes to prevention of an unauthorized cooperation.

In the case where the determination result shows that the unauthorized cooperation is established, preferably, the unauthorized-cooperation-of-applications control unit terminates the connection to the external communications network, using the application execution control technique shown in the control-of-application-execution setting information, based on the control-of-application-execution setting information showing an application execution control technique which terminates the connection to the external communications network.

This operation successfully terminates a connection to the external network after an unauthorized cooperation among the applications is specified, which contributes to preventing sensitive information such as personal information from leaking out via an external network.

In the case where the determination result shows that the unauthorized cooperation is established, preferably, the unauthorized-cooperation-of-applications control unit closes a running application included in the applications, using the application execution control technique shown in the control-of-application-execution setting information, until the determination shows that the unauthorized cooperation is not established, based on the control-of-application-execution setting information showing an application execution control technique which closes the running application until the unauthorized cooperation is not established.

This operation successfully closes applications until the multitasking status causes no unauthorized cooperation after an unauthorized cooperation among the applications is detected, which contributes to preventing sensitive information such as personal information from leaking out by the unauthorized cooperation.

In the case where the determination result shows that the unauthorized cooperation is established, preferably, the unauthorized-cooperation-of-applications control unit uninstalls the application that the request is made to start up, using the application execution control technique shown in the control-of-application-execution setting information, based on the control-of-application-execution setting information showing an application execution control technique which uninstalls the requested application.

This structure successfully uninstalls an application which is involved in an unauthorized cooperation, which contributes to preventing sensitive information such as personal information from leaking out by the unauthorized cooperation.

In the case where the determination result shows that the unauthorized cooperation is established, preferably, the unauthorized-cooperation-of-applications control unit notifies a user of information showing a potential risk of the unauthorized cooperation.

This structure makes it possible for the user to receive information indicating a potential risk of an unauthorized cooperation when there is the potential risk of the unauthorized cooperation, which allows the user himself or herself to control startup of an application.

Preferably, the access-history map updating unit updates an application-unauthorized-cooperation pattern showing an execution status of applications causing a potential risk of the unauthorized cooperation with further reference to the updated access-history map and the application authorizing list, and preferably, the unauthorized-cooperation-of-applications control unit determines whether or not the unauthorized cooperation is established among the applications with reference to the updated application-unauthorized-cooperation pattern.

This structure eliminates the need for analyzing the access-history map in determining whether or not an unauthorized cooperation is established, using an application-unauthorized-cooperation pattern showing information on a multi-tasking status found among applications and causing an unauthorized cooperation. This feature contributes to faster processing.

Preferably, the information processing apparatus further includes: a sensitive information holding unit which holds the sensitive information; an access-history map holding unit which holds the access-history map; an application authorizing list holding unit which holds the application authorizing list; and an application execution control setting information holding unit which holds application execution control setting information showing the technique of controlling execution of the applications for the unauthorized cooperation directed at the personal information among the applications, wherein the access-history map updating unit updates the access-history map held in the access-history map holding unit, and the unauthorized-cooperation-of-applications control unit (i) determines, with reference to information obtained from the updated access-history map and the application authorizing list held in the application authorizing list holding unit, whether or not an unauthorized cooperation, which is directed at the sensitive information held in the sensitive information holding unit, is established among the applications and, and (ii) controls execution of the applications, using an application execution control technique shown by the application execution control setting information held in the application execution control setting information holding unit, in the case where a result of the determination shows that the unauthorized cooperation is established.

According to this structure, the information processing apparatus includes sensitive information, an access-history map, an application authorizing list, and control-of-application-execution setting information. Based on such information, the information processing apparatus controls execution of the applications. Hence, the information processing apparatus successfully prevents an unauthorized cooperation found among applications and causing a leakage of sensitive information.

It is noted that, instead of being implemented as the information processing apparatus, the present invention may be implemented as (i) a method for preventing an unauthorized cooperation of applications which has, as steps, characteristic units included in the information processing apparatus and which prevents an unauthorized cooperation among the applications, and (ii) a program which causes a computer to execute the characteristic steps. As a matter of course, such a program may be distributed by a recording medium such as a CD-ROM, and a transmission medium such as the Internet.

Moreover, the present invention may be implemented part or all of the functions of the information processing apparatus in the form of a large scale integration (LSI).

Advantageous Effects of Invention

An information processing apparatus according to an implementation of the present invention successfully prevents an unauthorized cooperation among applications one another for leaking sensitive information, such as personal information. The prevention technique is also used for a newly-installed application.

BRIEF DESCRIPTION OF DRAWINGS

FIG. 6 exemplifies an application authorizing list held in an application authorizing list holding unit according to Embodiment 1 of the present invention.

FIG. 10 depicts a flowchart showing how the unauthorized-cooperation-of-applications control unit according to Embodiment 1 of the present invention determines whether or not an unauthorized cooperation is established.

FIG. 11 exemplifies control-of-application-execution setting information according to Embodiment 1 of the present invention.

FIG. 12 shows how the access-history map according to Embodiment 1 of the present invention transits.

FIG. 13 shows a configuration of the access-history map according to Embodiment 1 of the present invention.

DESCRIPTION OF EMBODIMENTS

Described hereinafter are the embodiments of the present invention, with reference to the drawings. It is noted that the embodiments are preferable specific examples of the present invention. The numerical values, the constituent elements, the positions of the constituent elements, the steps, and the order of the steps that are presented in the embodiments are just examples, and shall not define the present invention. The present invention shall be defined only by the claims. Thus, among the constituent elements in the embodiments, some of the constituent elements which are not described in an independent claim indicating the most generic concept of the present invention are not necessarily required to achieve the object of the present invention. Such constituent elements are described to form a preferred embodiment of the present invention.

Embodiment 1

Figure 1:
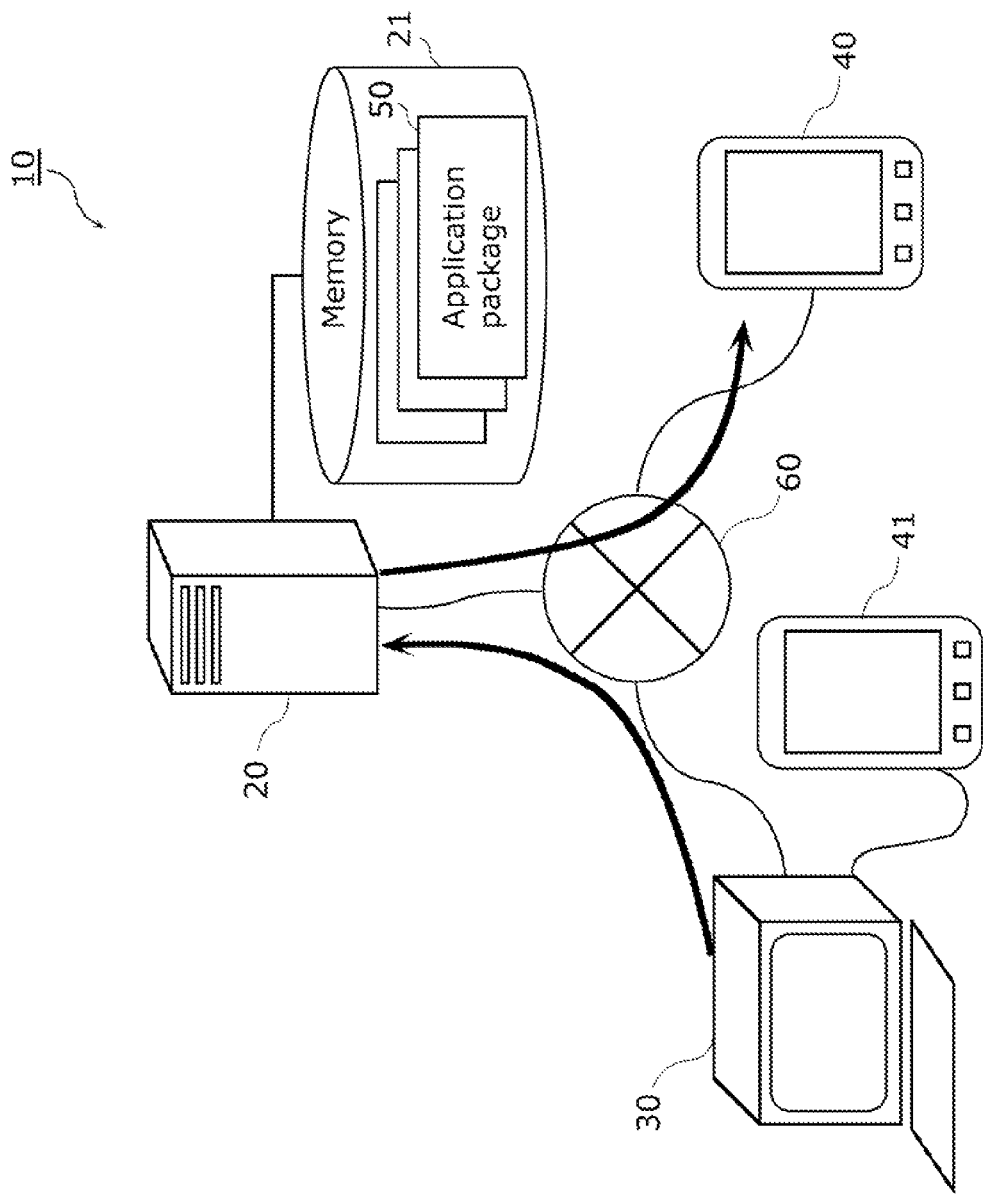
FIG. 1 illustrates a structure of an application distribution system according to Embodiment 1 of the present invention.

FIG. 1 illustrates a structure of an application distribution system 10 according to Embodiment 1 of the present invention.

As FIG. 1 shows, the application distribution system 10 includes an application distribution server 20, an application developing apparatus 30, and information processing terminals 40 and 41 which are information processing apparatuses.

The information processing terminal 40 downloads, via a communications network 60, an application package 50 stored in a memory 21 of the application distribution server 20. After the downloading, the information processing terminal 40 installs the application package 50 to obtain a new function. The configuration of the application package 50 shall be described later with reference to FIG. 2.

The application developing apparatus 30 develops an application which runs on the information processing terminal 40. Connected to the information processing terminal 41 via an interface, such as a universal serial bus (USB), the application developing apparatus 30 tests the developed application on the information processing terminal 41 to see whether or not the application runs as expected. Then, through the communications network 60, the application developing apparatus uploads the developed application to the application distribution server 20. It is noted that the information processing terminals 40 and 41 have the same functions.

Figure 2:
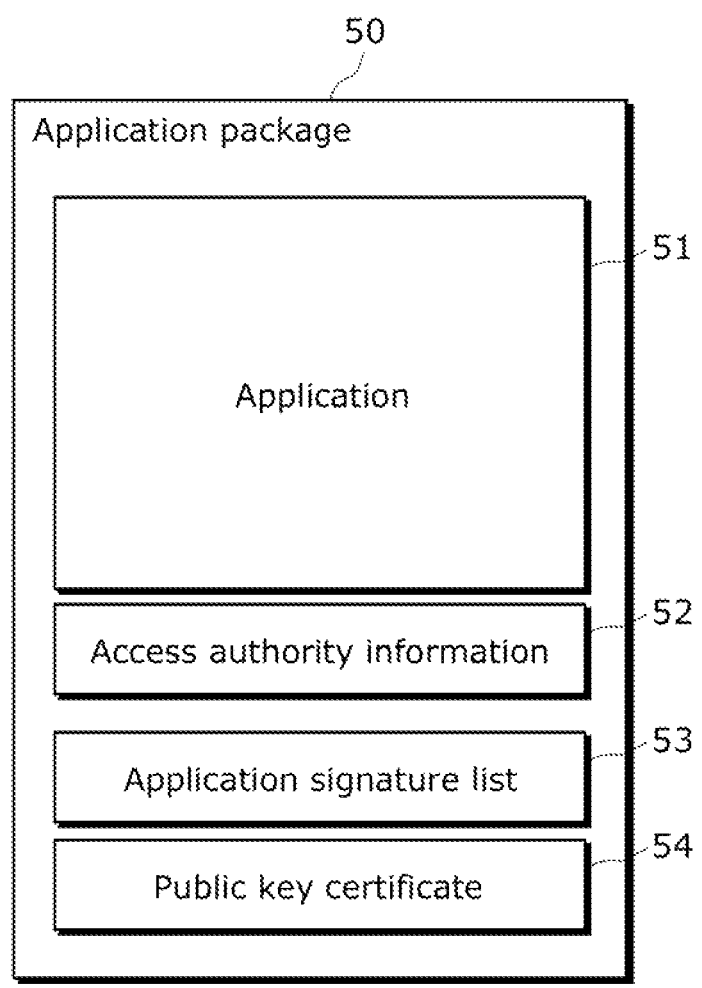
FIG. 2 illustrates a configuration of an application package according to Embodiment 1 of the present invention.

FIG. 2 illustrates a configuration of the application package 50 according to Embodiment 1 of the present invention. The application package 50 includes an application 51, access authority information 52, an application signature list 53, and a public key certificate 54.

The application 51 is the code of an application executed on the information processing terminal 40. In other words, the application 51 is code generated by a compiler and a linker of a not-shown software development kit (SDK) included in the application developing apparatus 30.

The access authority information 52 lists information on access authority when the application 51 runs on the information processing terminal 40. The access authority information 52 is used to show the user that the application 51 in the application package 50 is run by which authority, when the information processing terminal 40 installs the application package 50. Furthermore, the access authority information 52 is used to control the access given to application 51 when the application runs on the information processing terminal 40.

Here, the access authority information 52 lists information showing, for example, whether or not the application 51 has an access right to sensitive information including personal information, and an access right to an external network such as the communications network 60. It is noted that the sensitive information is kept secret, and includes personal information and confidential information of a corporation.

Moreover, the access right to sensitive information includes a right to write to and read from a memory such as a secure digital (SD) card, as well as a right to directly access to the sensitive information. In other words, gaining an access to sensitive information includes writing the sensitive information to the memory and reading the sensitive information from the memory.

It is noted that the access authority information 52 shall not be defined only as information showing whether or not there is an access right to sensitive information or to an external network. In other words, the access authority information 52 may be access authority information supported by a platform to run the application 51 on the information processing terminal 40.

The application signature list 53 lists hash values for all the information that configures the application package 50, and adds the digital signature to the information. When the application package 50 is installed, the application signature list 53 is used to verify the signature of the information included in the application package 50.

The public key certificate 54 stores information of the public key to be used for the signature verification with the application signature list 53.

An algorithm, which is widely used in a public key infrastructure (hereinafter referred to as PKI), may be used as an algorithm for generating and verifying the application signature. Moreover, the public key certificate 54 may be in X.509; namely, a certificate format widely used in the PKI.

Figure 3:
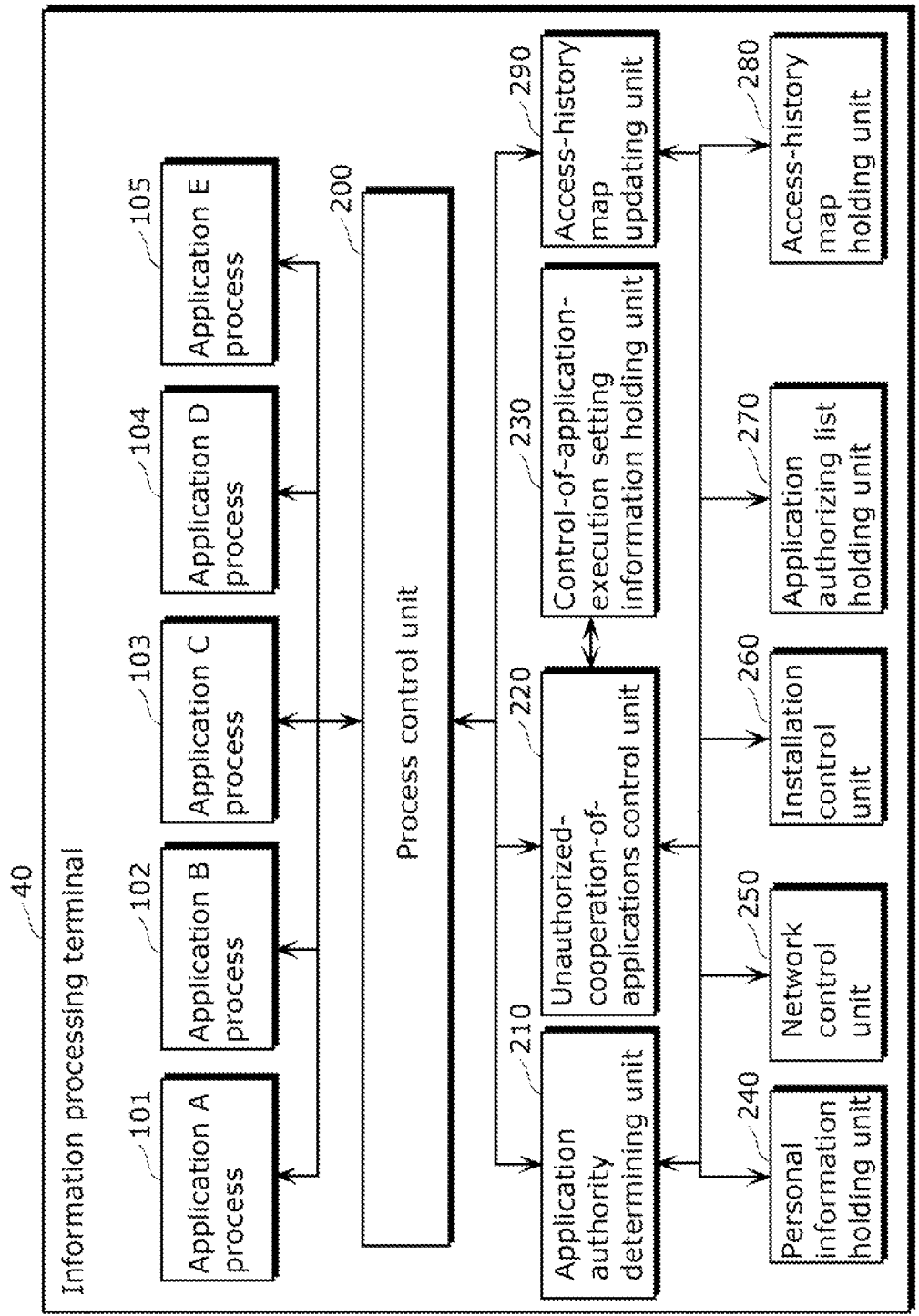
FIG. 3 illustrates a block diagram of an information processing terminal according to Embodiment 1 of the present invention.

FIG. 3 illustrates a block diagram of the information processing terminal 40 according to Embodiment 1 of the present invention.

As shown in FIG. 3, the information processing terminal 40 includes the following: five application processes including an application A process 101, an application B process 102, an application C process 103, an application D process 104, and an application E process 105; a process control unit 200; an application authority determining unit 210; an unauthorized-cooperation-of-applications control unit 220; a control-of-application-execution setting information holding unit 230; an access-history map updating unit 290; a personal information holding unit 240; a network control unit 250; an installation control unit 260; an application authorizing list holding unit 270; and an access-history map holding unit 280.

Here, the information processing terminal 40 may be a network-connectable device as follows: a mobile device such as a smartphone, a device for reproducing media such as a digital versatile disc (DVD) and a Blu-ray (Registered) disc (BD), consumer equipment such as a TV and a game console, and a personal computer (PC).

Furthermore, each of the control-of-application-execution setting information holding unit 230, the personal information holding unit 240, the application authorizing list holding unit 270, and the access-history map holding unit 280 is a data storage area in a memory included in the information processing terminal 40.

The installation control unit 260 installs an application. Specifically, when installing the application package 50 shown in FIGS. 1 and 2, the installation control unit 260 verifies the signature given to the application and notifies the user of access authority information. After the user gives the permission to install, the installation control unit 260 installs the application package 50.

Moreover, in association with an application ID 204 for identifying an application, the installed application package 50 is stored in a non-volatile memory (Not-shown). The public key certificate 54 in the application package 50 is managed in association with the application ID 204 as well. The access authority information 52 in the application package 50 is stored in an application authorizing list 271 held in the application authorizing list holding unit 270. The application authorizing list 271 shall be described later, with reference to FIG. 6.

Each of the application A process 101, the application B process 102, the application C process 103, the application D process 104, and the application E process 105 is an application process. The example in FIG. 3 shows the case where five applications are executed. As a process, there may be one other than an application process.

The process control unit 200 starts up the application and establishes cooperation among applications including the application.

Specifically, the process control unit 200 is a processing unit for managing the started five application processes (the application A process 101 to the application E process 105). For each of the application processes, the process control unit 200 holds a corresponding piece of process managing information 201 which associates a process ID 202 for identifying the process with the application ID 204. The process managing information 201 shall be described later, with reference to FIG. 7.

Furthermore, the process control unit 200 controls inter-process communication. When controlling the inter-process communication, the process control unit 200 requests the access-history map updating unit 290 to update an access-history map 281 recording an access relationship of each process. The update of the access-history map 281 shall be described later with reference to FIGS. 13, 14A, and 14B.

The personal information holding unit 240 holds an address book with personal information registered, such as phone numbers, addresses, and e-mail addresses. Furthermore, the personal information holding unit 240 may hold picture data and e-mail messages instead of the address book. Moreover, when the terminal records a personal life-log, the life-log information is regarded as the personal information. The life-log is information including a buying history, position information of a person, and a history of past searches on the Internet.

Here, in addition to or instead of personal information, the personal information holding unit 240 may hold confidential information such as company secret. In other words, the personal information holding unit 240 may be a sensitive information holding unit which holds sensitive information managed as secret, such as personal information or confidential information. The information processing terminal 40 may be able to prevent the leak of the sensitive information; instead, described below is how the information processing terminal 40 prevents the leak of personal information.

It is noted that in Embodiment 1, the information processing terminal 40 prevents all of the personal information from leaking to outsiders; instead, the information processing terminal 40 may be set to prevent the leak according to the type of each piece of the personal information. For example, the information processing terminal 40 may be set to transmit the user's life-log in the personal information, so that the user can receive services which suit his or her life style. Although not shown in Embodiment 1, in such a case, the information processing terminal 40 holds setting information for sending out only the life-log, and further for preventing other personal information from leaking out. Hence, an access to the personal information may be controlled by the unauthorized-cooperation-of-applications control unit 220 referring to the setting information. Furthermore, the setting information may be set by the user.

The network control unit 250 establishes a connection to the external communications network 60. In other words, the network control unit 250 controls a network device for establishing a connection to the external network. External network devices include a wireless network device and a wired network device. The network control unit 250 may be a processing unit for controlling a connection of a cellular phone to a communications network.

When the five application processes (the application A process 101 to the application E process 105) access the personal information holding unit 240 and the network control unit 250 via the process control unit 200, the application authority determining unit 210 determines whether or not the accesses are permitted with reference to the application authorizing list 271 held in the application authorizing list holding unit 270 shown in FIG. 6. The determination result made by the application authority determining unit 210 is returned to the process control unit 200. Based on the determination result, the process control unit 200 controls an access to the personal information holding unit 240 and to the network control unit 250.

Described next are the access-history map updating unit 290 and the access-history map holding unit 280.

The access-history map holding unit 280 holds the access-history map 281 which represents the history information on an access relationship among the application processes (the application A process 101 to the application E process 105) shown in FIG. 3.

When a request is made to start up the application or to establish cooperation among the applications, the access-history map updating unit 290 updates the access-history map 281. The updated access-history map is a map when the requested startup is executed or when the requested cooperation is established. Specifically, in response to the request from the process control unit 200 for updating the access-history map 281, the access-history map updating unit 290 accesses the access-history map holding unit 280 and updates the access-history map 281. The update of the access-history map 281 shall be described later with reference to FIGS. 13, 14A, and 14B.

Described next are the unauthorized-cooperation-of-applications control unit 220 and the control-of-application-execution setting information holding unit 230.

The control-of-application-execution setting information holding unit 230 has setting information registered. The setting information is used to cope with the behavior of the applications after an unauthorized cooperation among the applications is detected. Specifically, the control-of-application-execution setting information holding unit 230 holds application execution control setting information 231 showing an application execution control technique depending on the unauthorized cooperation, which is directed at the personal information, established among the applications. Here, the application execution control setting information 231 is capable of showing an application execution control technique. The execution control technique makes it possible to prevent an unauthorized cooperation among the applications from leaking personal information via the external communications network 60.

With reference to the access-history map 281 and the application authorizing list 271, the unauthorized-cooperation-of-applications control unit 220 determines whether or not an unauthorized cooperation, which is directed at personal information, is established among the applications. In the case where the determination result shows that the unauthorized cooperation is established, the unauthorized-cooperation-of-applications control unit 220 controls the execution of the application, using the application execution control technique indicated in the application execution control setting information 231. Specifically, the unauthorized-cooperation-of-applications control unit 220 determines whether or not the unauthorized cooperation is established. In the case where the determination result shows the unauthorized cooperation, the unauthorized-cooperation-of-applications control unit 220 controls the execution of the applications based on the application execution control setting information 231 showing an application execution control technique. The execution control technique can prevent the unauthorized cooperation.

In other words, the unauthorized-cooperation-of-applications control unit 220 is a processing unit for controlling the execution of the applications to prevent an application execution status which causes a potential risk of a personal information leakage via an external network; that is, to prevent an unauthorized cooperation among the applications. Specifically, with reference to the application authorizing list 271 held in the application authorizing list holding unit 270 and the access-history map 281 held in the access-history map holding unit 280, the unauthorized-cooperation-of-applications control unit 220 determines whether or not the execution status of an application causes a potential risk of a personal information leakage via the external network.

In the case where the determination result shows that the unauthorized cooperation is found; that is there is a potential risk of the personal information leakage via the external network, the unauthorized-cooperation-of-applications control unit 220 controls the execution of the application processes based on the application execution control setting information 231. The details of the determination process executed by the unauthorized-cooperation-of-applications control unit 220 and the application control technique based on the application execution control setting information 231 shall be described with reference to FIGS. 8 to 15, showing some examples.

Figure 4:
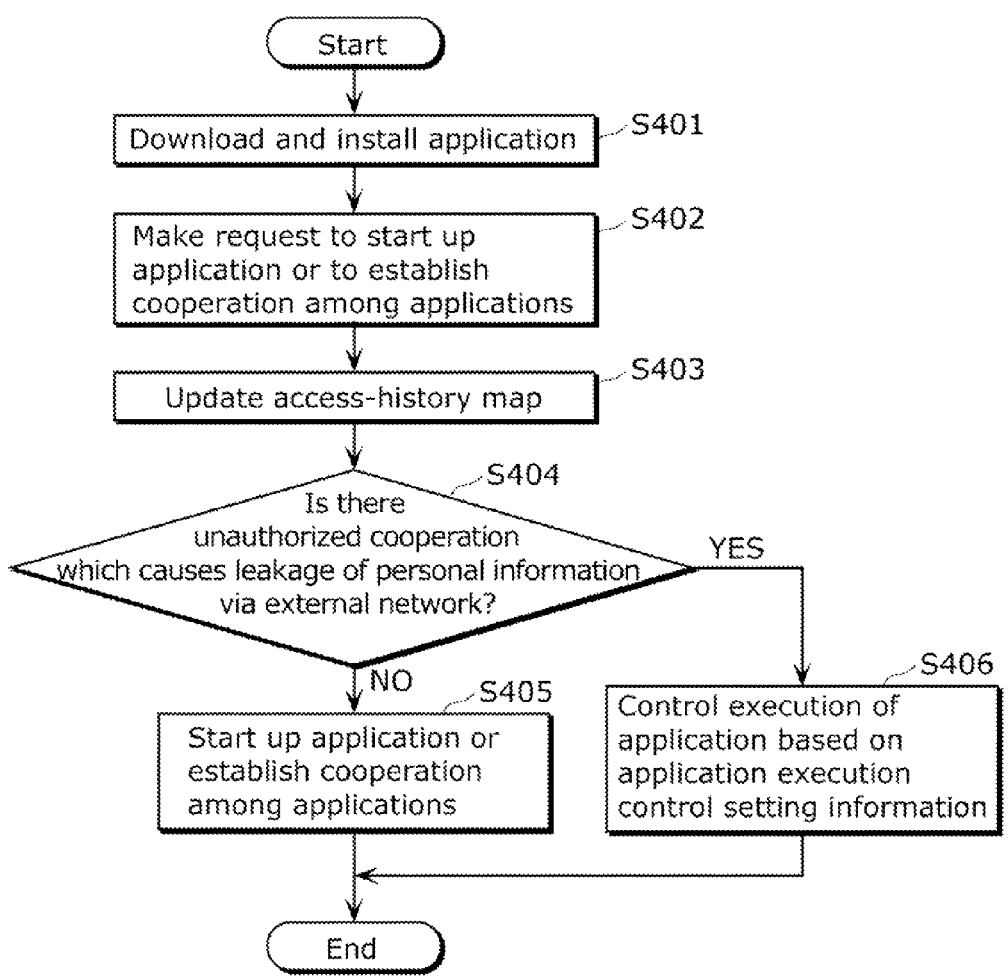
FIG. 4 shows a flowchart exemplifying an operation of the information processing terminal according to Embodiment 1 of the present invention.

FIG. 4 shows a flowchart exemplifying an operation of the information processing terminal 40 according to Embodiment 1 of the present invention. Specifically, FIG. 4 illustrates a schematic flow in the information processing terminal 40 from the installation of the application package 50 to the control of the operation of the applications for preventing personal information from leaking out to the external network.

First, the information processing terminal 40 downloads the application package 50 in the application distribution server 20 via the communications network 60. After the download, the installation control unit 260 in the information processing terminal 40 installs the application package 50 (S401). In S401, the installation control unit 260 verifies the signature on a file in the application package 50. In the case where the signature is valid, the installation control unit 260 notifies the user of access authority information. After the user gives the permission to install, the installation control unit 260 installs the application package 50. The flow of the installation shall be described later with reference to FIG. 5.

Next, a request is made to start up an application installed in the information processing terminal 40 or to establish cooperation among the applications (S402). The request in S402 is sent to the process control unit 200. An application to be requested to start up or to establish inter-process communication may be pre-installed, as well as downloaded from the application distribution server 20.

Here, the public key certificate 54 and the access authority information 52 of the pre-installed application are managed in the same manner as those of an application downloaded from the application distribution server 20. Moreover, the startup request or the inter-process communication request of the application may be either explicitly made by the user or automatically made without a request from the user during the startup of the application Next, after receiving the request in S402, the process control unit 200 specifies an application-to-be-requested for startup or an application-to-be-requested for inter-process communication, specifies an accessing application process and an accessed application process, and records the access relationship between the accessing application process and the accessed application process in the form of a map in order to generate and update the access-history map 281 in the access-history map holding unit 280 (S403).

Next, with reference to the application authorizing list 271 held in the application authorizing list holding unit 270 and the access-history map 281 held in the access-history map holding unit 280, the unauthorized-cooperation-of-applications control unit 220 determines, based on the current process execution status, whether or not the execution status of the application requested in S402 causes a risk of potential leakage of the personal information via the external network when the application starts up or when the inter-process communication is requested (S404).

In the case where the unauthorized-cooperation-of-applications control unit 220 determines that there is no risk of the leakage of the personal information via the external network (No unauthorized cooperation. S404: NO), the process control unit 200 starts up the application requested in S402 or establishes cooperation among the applications (S405).

In the case where the unauthorized-cooperation-of-applications control unit 220 determines that there is a potential risk of the leakage of the personal information via the external network (Unauthorized cooperation. S404: YES), the unauthorized-cooperation-of-applications control unit 220 controls the execution of the requested application based on the application (S406).

Figure 5:
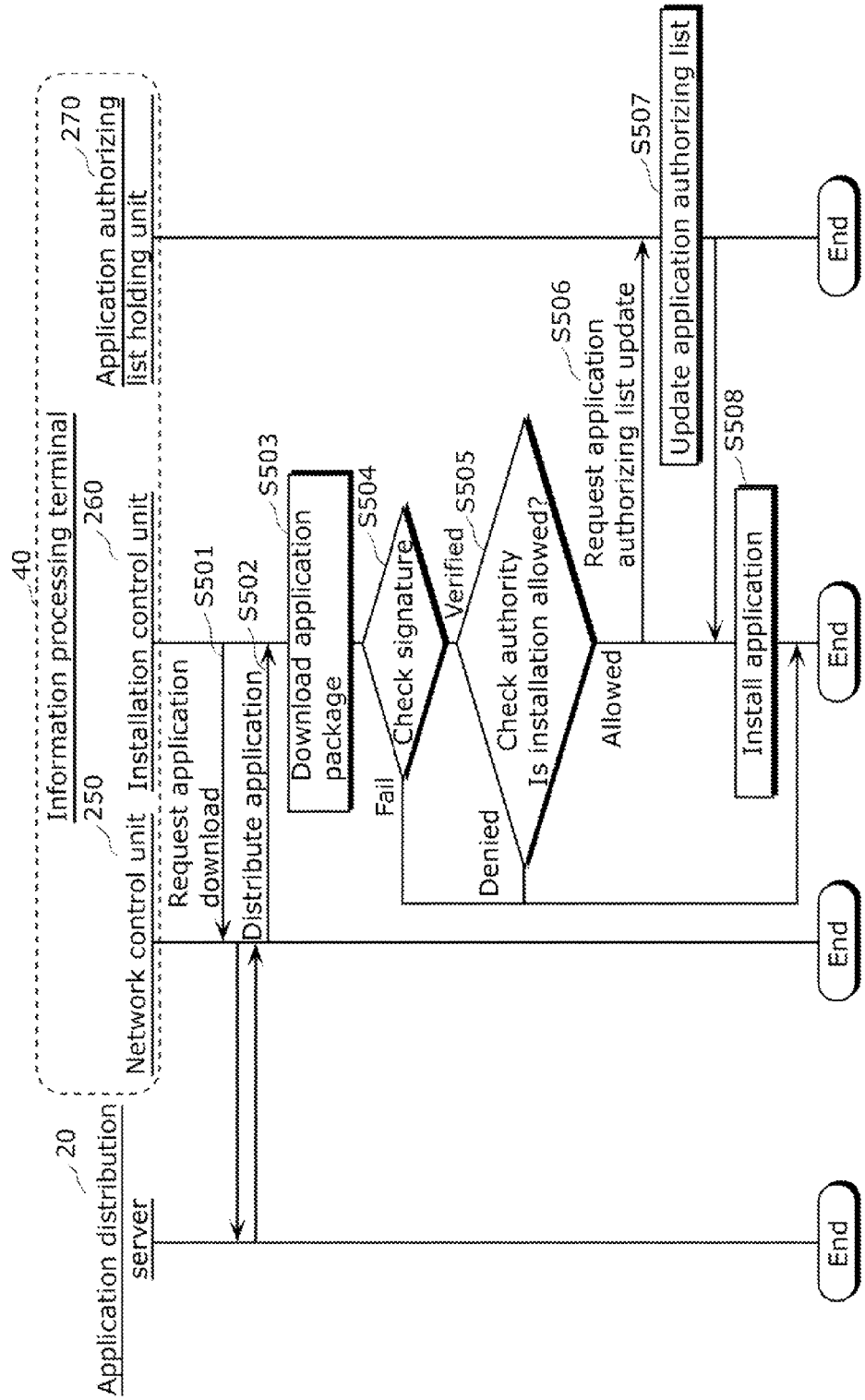
FIG. 5 depicts a sequential diagram illustrating a process of how an installation control unit according to Embodiment 1 of the present invention installs an application.

FIG. 5 depicts a sequential diagram illustrating a process of how installation control unit 260 according to Embodiment 1 of the present invention installs an application. In other words, FIG. 5 is a detailed flowchart showing how the information processing terminal 40 downloads and installs the application package 50 stored in the application distribution server 20 via the communications network 60 (S401 in FIG. 4).

First, the installation control unit 260 in the information processing terminal 40 establishes a connection with the external communications network 60 via the network control unit 250, and sends an application download request to the application distribution server 20 (S501). Here, the application download request is a request to download the application package 50.

Next, the application distribution server 20 distributes the requested application package 50 to the information processing terminal 40 (S502).

Then, the installation control unit 260 downloads the application package 50 (S503).

Next, the installation control unit 260 verifies the signature on the application package 50 (S504). The signature verification involves, based on the public key certificate 54, checking whether or not the application signature list is falsified, and checking whether or not each of the files in the application package 50 is falsified. In the case where the result of the signature verification is "verification failed" (S504: Fail), the installation of the application package 50 ends. In contrast, in the case where the result of the signature verification is "verified" (S504: Verified), the process proceeds to S505.

Then, with reference to the access authority information 52 in the application package 50, the installation control unit 260 checks what authority the application-to-be-installed has, and determines whether the installation of the application is allowed or denied (S505).

For example, the installation control unit 260 shows the user the contents of the access authority information 52, and let the user judge whether or not the installation is allowed. Moreover, the installation control unit 260 may record in advance a whitelist which lists applications whose installation is allowed and a blacklist which lists applications whose installation is denied. Based on the contents of the lists, the installation control unit 260 may determine whether or not the installation is allowed. Furthermore, the contents of the lists may be set by the user.

Then, in the case where the determination result of S505 indicates "Installation denied" (S505: "Denied"), the installation of the application package 50 ends. In contrast, in the case where the determination result of S504 indicates "Installation allowed" (S505: "Allowed"), the installation control unit 260 sends an application authorizing list update request (S506). Here, the application authorizing list update request is a request to update the application authorizing list 271.

The application authorizing list update request is issued to add the access authority information 52 of the application-to-be-installed to the application authorizing list 271 held in the application authorizing list holding unit 270.

Next, the installation control unit 260 records the application 51 in a not-shown non-volatile memory, and manages the application 51 and the application ID 204 for identifying the application 51 in association with each other. The public key certificate 54 in the application package 50 is also managed in association with the application ID 204 (S508).

That is the end of the description regarding the installation process flow of the application package 50.

FIG. 6 exemplifies the application authorizing list 271 held in the application authorizing list holding unit 270 according to Embodiment 1 of the present invention. FIG. 6 exemplifies the case where five application processes (the application A process 101 to the application E process 105) are installed, as shown in FIG. 3.

The application authorizing list 271 includes fields of the application ID 204 for identifying an application, fields of an install path 272 indicating the destination of the application to be installed, and fields of access authority setting 273 including the contents of the access authority information 52 for a corresponding one of the applications.

The example in FIG. 6 shows that the application A indicated by the application A process 101 in FIG. 3 is an application for a photo viewer. Here, the application ID is "A", the install path is "/data/app/photoviewer.exe", an access to personal information is allowed, and an access to an external network is denied.

The application C indicated by the application C process 103 is a browser application. Here, the application ID is "C", the install path is "/data/app/browser.exe", an access to personal information is denied, and an access to an external network is allowed. The other applications are configured in a similar manner, and the descriptions thereof shall be omitted.

Hence, the application authorizing list holding unit 270 holds the application authorizing list 271 including access authority information representing an access right to personal information and access authority information showing an access right to the external communications network 60.

Figure 7:
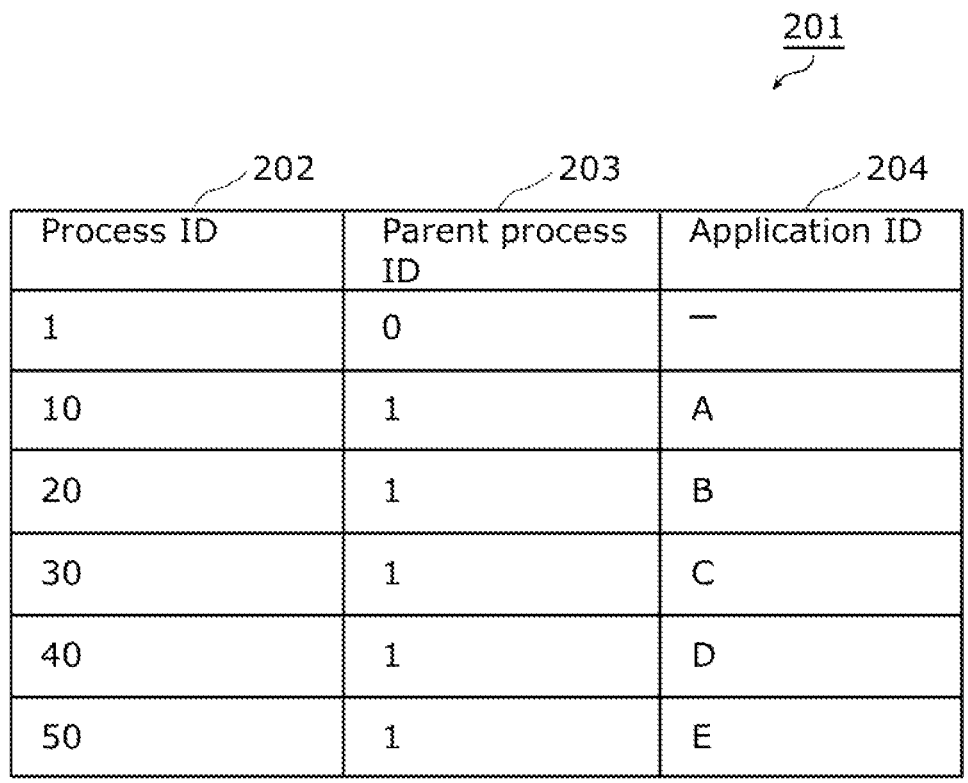
FIG. 7 exemplifies process managing information held in a process control unit according to Embodiment 1 of the present invention when the process control unit identifies the process status of an executing application.

FIG. 7 exemplifies process managing information 201 held in the process control unit 200 according to Embodiment 1 of the present invention when the process control unit 200 identifies the process status of an executing application.

The process managing information 201 includes fields of the process ID 202 for identifying a process, fields of a parent process ID 203 for identifying the parent process of the process, and fields of the application ID 204 for identifying the process corresponds to which application.

The example in FIG. 7 shows that the application A indicated by the application A process 101 in FIG. 3 runs with the process ID of "10". The application A has the parent process ID of "1" and the application ID of "A". The other applications are configured in a similar manner, and the descriptions thereof shall be omitted.

Figure 8:
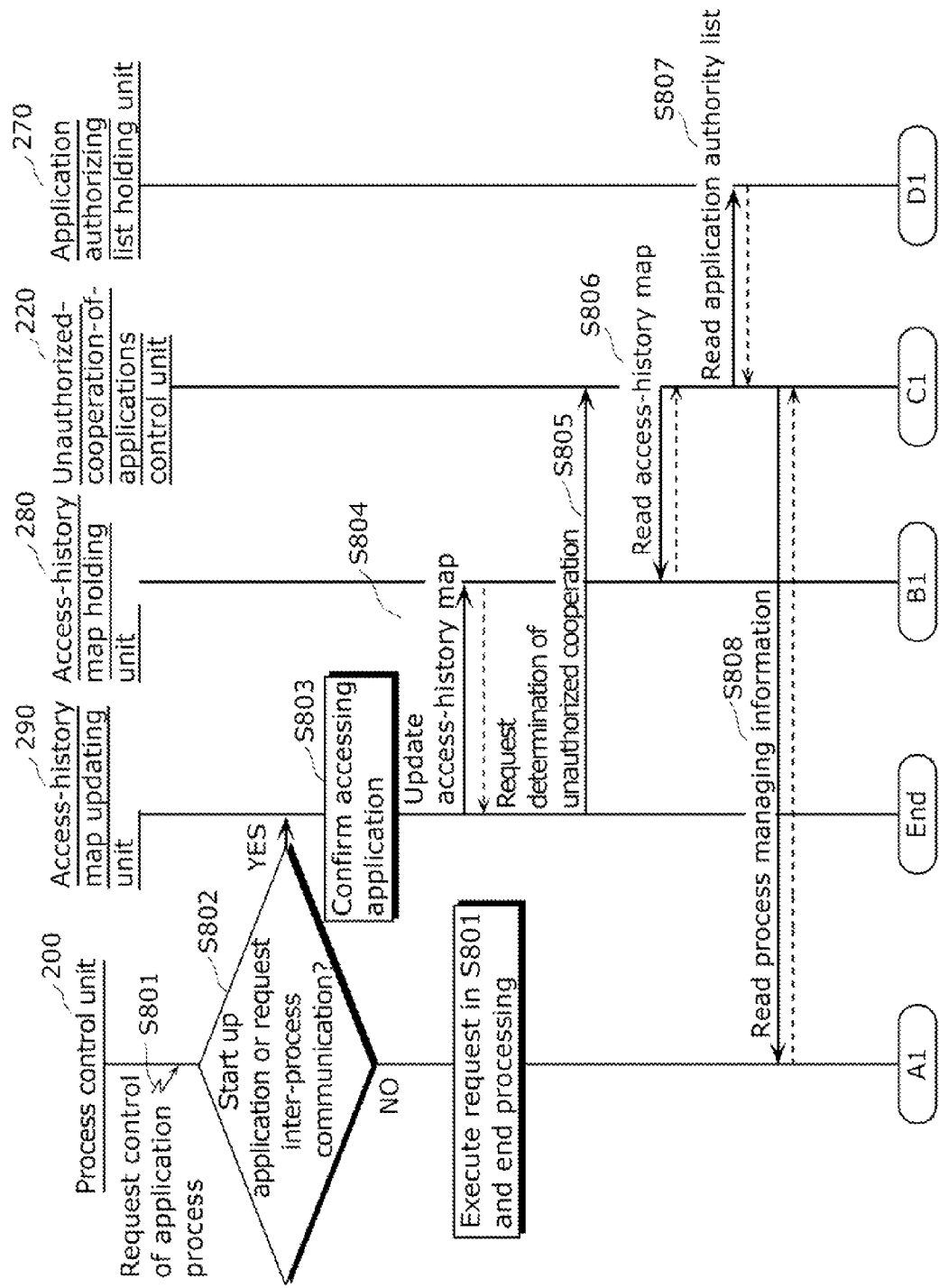
FIG. 8 depicts a sequential diagram showing a process from update of an access-history map by an access-history map updating unit to determination of unauthorized corporation by an unauthorized-cooperation-of-applications control unit according to Embodiment 1 of the present invention.
Figure 9:
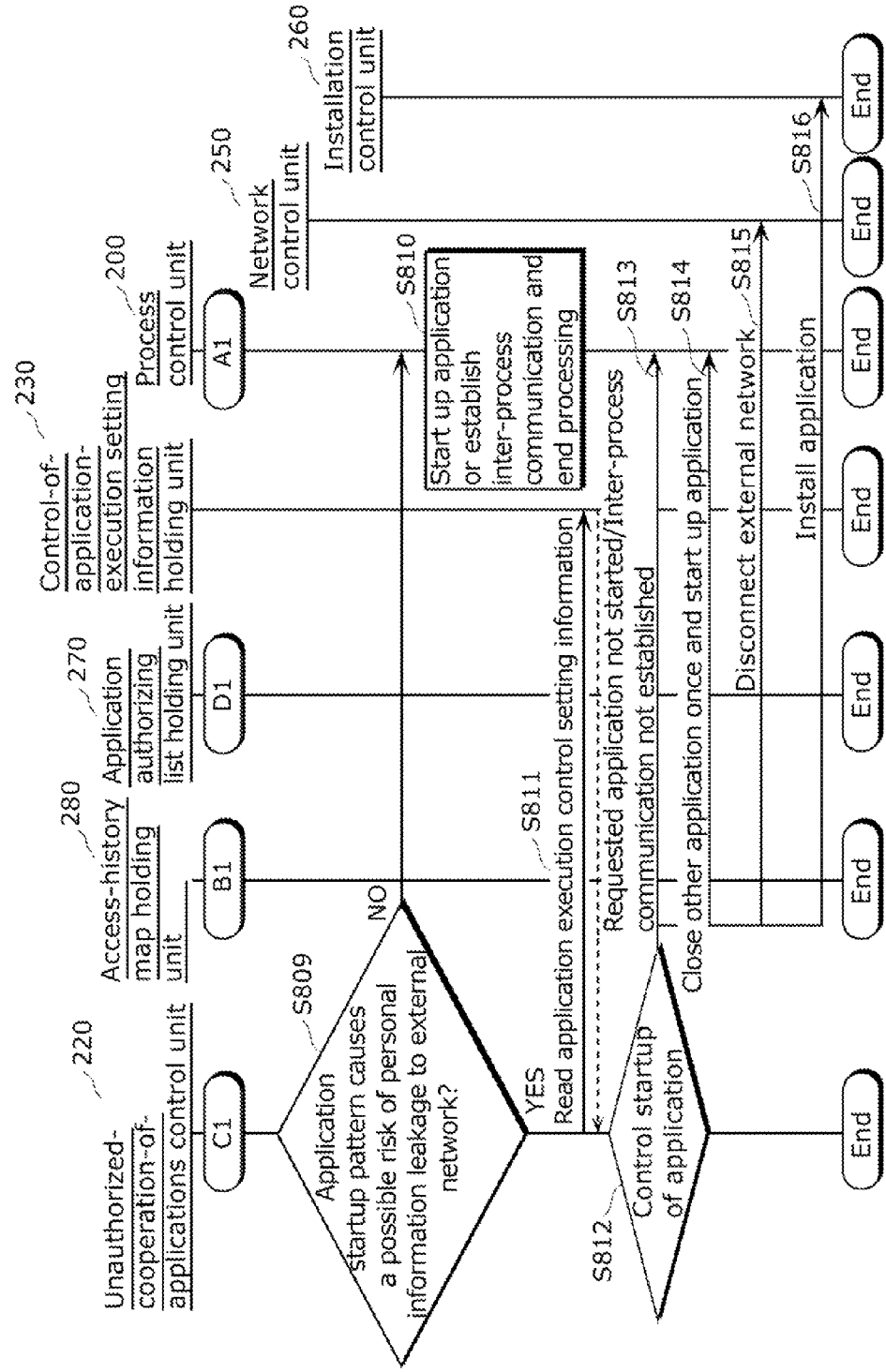
FIG. 9 depicts a sequential diagram showing a process from the update of an access-history map by the access-history map updating unit to the determination of the unauthorized corporation by the unauthorized-cooperation-of-applications control unit according to Embodiment 1 of the present invention.

FIGS. 8 and 9 depict sequential diagrams showing a process from update of an access-history map by the access-history map updating unit 290 to determination of unauthorized corporation by the unauthorized-cooperation-of-applications control unit 220 according to Embodiment 1 of the present invention.

First, as shown in FIG. 8, the process control unit 200 receives a request for controlling the process of an application (An application startup request or an inter-process communication request, and a process stop and end request. S801).

Next, the process control unit 200 determines whether or not the received request is either for application startup or inter-process communication (S802). In the case where the determination result shows that the received request is for the application startup or the inter-process communication (S802: YES), the process control unit 200 executes S803. In the case where the determination result shows that the received request is neither for the application startup nor the inter-process communication (S802: NO), the process control unit 200 executes the processing requested in S801.

Then, the access-history map updating unit 290 confirms an accessing application (S803). In the case where the request received by the process control unit 200 is either for the application startup or the inter-process communication, the access-history map updating unit 290 confirms an accessing process and an accessed process.

Then, the access-history map updating unit 290 writes the access relationship confirmed in S803 in the access-history map 281 held in the access-history map holding unit 280, and updates the access-history map 281 (S804).

Next, the access-history map updating unit 290 executes the process control request requested in S801 to send an unauthorized cooperation determination request to the unauthorized-cooperation-of-applications control unit 220 so as to determine whether or not the execution status of an application causes a potential risk of a personal information leakage via an external network (S805).

Upon receiving the unauthorized cooperation determination request in S805, the unauthorized-cooperation-of-applications control unit 220 reads the access-history map 281 from the access-history map holding unit 280 (S806).

Then, the unauthorized-cooperation-of-applications control unit 220 reads the application authorizing list 271 from the application authorizing list holding unit 270 (S807).

Next, the unauthorized-cooperation-of-applications control unit 220 reads the process managing information 201 from the process control unit 200 (S808).

Then, as shown in FIG. 9, the unauthorized-cooperation-of-applications control unit 220 (i) executes the process control request requested in S801 with reference to the access-history map 281, the application authorizing list 271, and the process managing information 201 read in S806 to S808, and (ii) determines whether or not the information processing terminal 40 is ready for multitasking which causes a potential risk of a personal information leakage via the external network (S809).

Detailed steps and a specific example of the above-described determination technique shall be provided with reference to FIGS. 10 and 12.

In the case where the unauthorized-cooperation-of-applications control unit 220 determines that there is no risk of a personal information leakage via the external network (No unauthorized cooperation. S809: NO), the process control unit 200 executes the processing requested in S801 in FIG. 8 (S810).

In the case where the determination result shows that there is a potential risk of a personal information leakage via the external network (Unauthorized cooperation. S809: YES), the unauthorized-cooperation-of-applications control unit 220 reads the application execution control setting information 231 registered in the control-of-application-execution setting information holding unit 230 (S811), and controls the execution of the application (S812). The application execution control shall be described with reference to S813 to S816 and FIG. 11.

Although not shown, in the case where the determination result shows that an unauthorized cooperation is established in S809, the unauthorized-cooperation-of-applications control unit 220 may notify the user of the potential risk of the unauthorized cooperation. This operation allows the user himself or herself to control the startup of an application when an unauthorized cooperation can be caused.

FIG. 10 depicts a flowchart showing how the unauthorized-cooperation-of-applications control unit 220 according to Embodiment 1 of the present invention determines whether or not an unauthorized cooperation is established. Specifically, FIG. 10 is a sequential diagram which breaks down S809 in FIG. 9 into detailed steps.

First, with reference to the application authorizing list 271 read in S807 in FIG. 8, the unauthorized-cooperation-of-applications control unit 220 specifies an application ID which is authorized to access personal information (S901).

Next, with reference to the application authorizing list 271 read in S807 in FIG. 8, the unauthorized-cooperation-of-applications control unit 220 specifies an application ID which is authorized to access an external network (S902).

Then, with reference to the application IDs specified in S901 and S902 and to the access-history map 281 read in S806 in FIG. 8, the unauthorized-cooperation-of-applications control unit 220 lists a multitasking status which enables to access personal information from an application to access personal information to an application to access the external network (S903).

The multitasking status to be listed in S903 in Embodiment 1 shall not be defined only one status; instead, there may be two or more multitasking statuses. In order to prevent the leakage of the personal information via the external network in Embodiment 1, execution of an application is controlled in order to avoid the multitasking status specified in S903.

Next, with reference to the process managing information 201 read in S808 in FIG. 8, the unauthorized-cooperation-of-applications control unit 220 specifies a process which has currently started up, and predicts a multitasking status pattern observed when the request in S801 in FIG. 8 is executed (S904).

Then, the unauthorized-cooperation-of-applications control unit 220 determines whether or not the multitasking status predicted in S904 is listed as the multitasking status specified in S903 (S905).

In the case where the determination result shows that the multitasking status is listed, (S905: YES), the multitasking status causes a potential leakage of personal information. Thus, the unauthorized-cooperation-of-applications control unit 220 forwards the processing to S812 in FIG. 9 in order to control the execution of the application.

In the case where the determination result shows that the multitasking status is not listed (S905: NO), the multitasking status causes no potential leakage of personal information. Thus, the unauthorized-cooperation-of-applications control unit 220 forwards the processing to S810 in FIG. 9 in order to execute the processing requested in S801 in FIG. 8.

FIG. 11 exemplifies the control-of-application-execution setting information 231 according to Embodiment 1 of the present invention.

The application execution control setting information 231 is a group of information set for controlling a behavior of an application in the case where the determination in S809 in FIG. 9 shows that there is a potential risk of a personal information leakage via an external network (unauthorized cooperation). Specifically, the application execution control setting information 231 includes fields of an application behavior control content 233 used when an unauthorized cooperation is determined, and fields of ON and OFF information 232 for setting each control content to either Enable or Disable.

In the example in FIG. 11, registered are four control contents: "Requested application not started/Inter-process communication not established", "External network forcefully disconnected", "Application uninstalled", and "Executing application closed to create safe multitasking status with no risk of personal information leakage". "Requested application not started/Inter-process communication not established" is set to "ON".

When "Requested application not started/Inter-process communication not established" is "ON" as shown in FIG. 11, the unauthorized-cooperation-of-applications control unit 220 notifies, after the determination in S812 in FIG. 9, the process control unit 200 not to start up the application requested in S801 (S813 in FIG. 9).

Hence, in the case where the request in S801 in FIG. 8 is application-start-up, the unauthorized-cooperation-of-applications control unit 220 prevents the requested application from starting up. This feature successfully avoids a multitasking status which causes a potential risk of a personal information leakage via the external network. Moreover, in the case where the request in S801 in FIG. 8 is inter-process communication, the process control unit 200 does not establish the requested inter-process communication, and avoids executing inter-process communication which causes a potential risk of a personal information leakage via the external network. This feature successfully prevents a leakage of personal information via the external network.

In other words, the control-of-application-execution setting information holding unit 230 holds the application execution control setting information 231 showing an application execution control technique which avoids the requested starting up of the application. In the case where the unauthorized-cooperation-of-applications control unit 220 determines that an unauthorized cooperation is established, the unauthorized-cooperation-of-applications control unit 220 avoids the requested starting up of the application, using the application execution control technique shown in application execution control setting information 231.

When "Executing application closed to create safe multitasking status with no risk of personal information leakage" is "ON" in FIG. 11, the unauthorized-cooperation-of-applications control unit 220 (i) closes an other executing application until the multitasking status causes no potential risk of a personal information leakage via the external network even though the requested application in S801 in FIG. 8 is started up and (ii) starts up the application requested in S801 in FIG. 8 or establishes inter-process communication (S814 in FIG. 9). This feature successfully prevents the multitasking status that causes a potential risk of a personal information leakage via an external network.

In other words, the control-of-application-execution setting information holding unit 230 holds the application execution control setting information 231 showing an application execution control technique for closing applications until the unauthorized-cooperation-of-applications control unit 220 determines that there is no unauthorized cooperation. In the case where the unauthorized-cooperation-of-applications control unit 220 determines that an unauthorized cooperation is established, the unauthorized-cooperation-of-applications control unit 220 closes the executing application using the application execution control technique shown in application execution control setting information 231, until the unauthorized-cooperation-of-applications control unit 220 determines that there is no unauthorized cooperation.

When "External network forcefully disconnected" is "ON" in FIG. 11, the unauthorized-cooperation-of-applications control unit 220 notifies, after the determination in S812 in FIG. 9, the network control unit 250 to forcefully disconnect the network (S815 in FIG. 9). This feature makes it possible to start up the application requested in S801 in FIG. 8 or to establish inter-process communication with an external network disconnected, which contributes to preventing personal information from leaking out via the external network.

In other words, the control-of-application-execution setting information holding unit 230 holds the application execution control setting information 231 showing an application execution control technique for terminating the connection to the external communications network 60. In the case where the unauthorized-cooperation-of-applications control unit 220 determines that an unauthorized cooperation is established, the unauthorized-cooperation-of-applications control unit 220 terminates the connection to the external communications network 60, using the application execution control technique shown in the application execution control setting information 231.

When "Application uninstalled" is "ON" in FIG. 11, the unauthorized-cooperation-of-applications control unit 220 requests the installation control unit 260, after the determination in S812 in FIG. 9, to uninstall the application requested in S801 in FIG. 8. This feature makes it possible to uninstall an application in a multitasking status which causes a potential risk of a personal information leakage via an external network.

In other words, the control-of-application-execution setting information holding unit 230 holds the application execution control setting information 231 showing an application execution control technique for uninstalling an application. In the case where unauthorized-cooperation-of-applications control unit 220 determines that an unauthorized cooperation is established, the unauthorized-cooperation-of-applications control unit 220 uninstalls the requested application using the application execution control technique shown in the application execution control setting information 231.

It is noted that the unauthorized-cooperation-of-applications control unit 220 may automatically select or the user may select whether or not which application execution control information 231 shown in FIG. 11 is set to "ON". In the case where an application-to-be-controlled is to be preferentially updated, the execution control of the application may be canceled.

Furthermore, the information processing terminal 40 does not have to include the control-of-application-execution setting information holding unit 230. Without reference to the application execution control setting information 231, the unauthorized-cooperation-of-applications control unit 220 may control execution of an application using a predetermined application execution control technique.

FIG. 12 shows how the access-history map 281 according to Embodiment 1 of the present invention transits. In other words, FIG. 12 illustrates how the access-history map 281 is updated when an application starts up and when inter-process communication is established.

Status 1 in FIG. 12 shows the following: The application C process 103, the application D process 104, and the application E process 105 are started up; and the application D process 104 establishes inter-process communication with the application C process 103 and with the application E process 105.

Status 2 in FIG. 12 shows the following after Status 1: The application B process 102 is started up, and establishes inter-process communication with the application C process 103.

Status 3 in FIG. 12 shows the following after the Status 2: The application A process 101 is started up, and establishes inter-process communication with the application B process 102.

Status 4 in FIG. 12 shows the following after the Status 3: The application A process 101 is started up, and establishes inter-process communication with the application D process 104.

Here, as shown in FIG. 6, the application A process 101 can access to personal information. The application C process 103 can access to an external network, but cannot access to personal information. Thus, in the case where multitasking is utilized to start up an application on an accessing path from the application A process 101 to the application C process 103, there is a potential risk of personal information leakage to outsiders via the external network.

Specifically, State 3 shows that the multitasking status of {the application A process 101-the application B process 102-the application C process 103} causes the potential risk of personal information leakage to outsiders via the external network. Moreover, State 4 shows that, in addition to State 3, the multitasking status of {the application A process 101-the application D process 104-the application C process 103} causes the potential risk of personal information leakage to the external network.

In the case of State 4 in FIG. 12, for example, the unauthorized-cooperation-of-applications control unit 220 controls applications to avoid the above two multitasking statuses in order to prevent personal information from leaking out via the external network.

FIG. 13 shows a configuration of the access-history map 281 according to Embodiment 1 of the present invention. Specifically, FIG. 13 shows the access-history map 281 in State 4 of FIG. 12 in the form of a list. Actually, the access-history map holding unit 280 holds the access-history map 281 in the form of the list shown in FIG. 13.

The access-history map 281 includes an application ID 282, and an accessed application ID 283 which represents an accessed ID for each of the applications. For example, the application ID "A" has an access relationship with the application IDs "B" and "D".

With reference to the access-history map 281 and the application authorizing list 271, the unauthorized-cooperation-of-applications control unit 220 successfully determines which multitasking status causes the potential risk of a personal information leakage via the external network. It is noted that the examples in FIGS. 12 and 13 show a one-way access relationship in the inter-process communication; instead, the access relationship may be in two-way since this is inter-process communication.

Figure 14A:
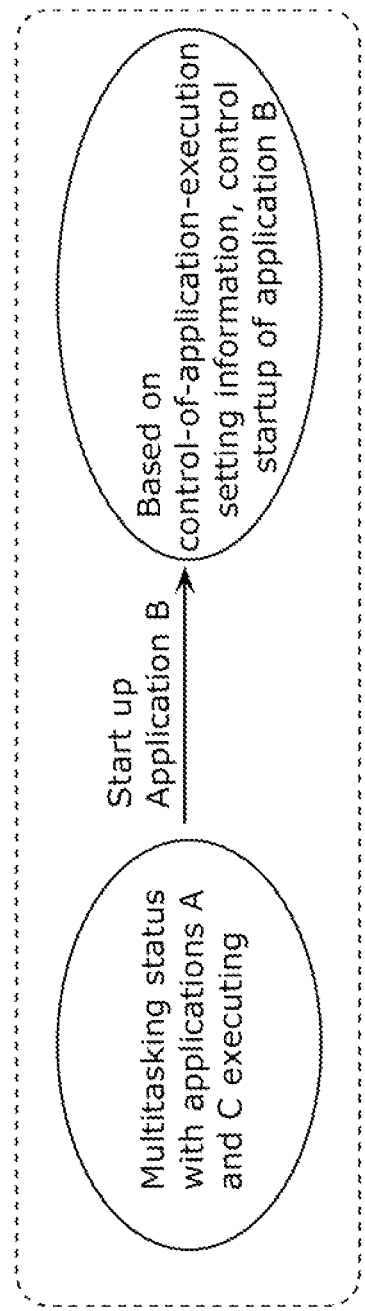
FIG. 14A exemplifies application execution control by the unauthorized-cooperation-of-applications control unit according to Embodiment 1 of the present invention.
Figure 14B:
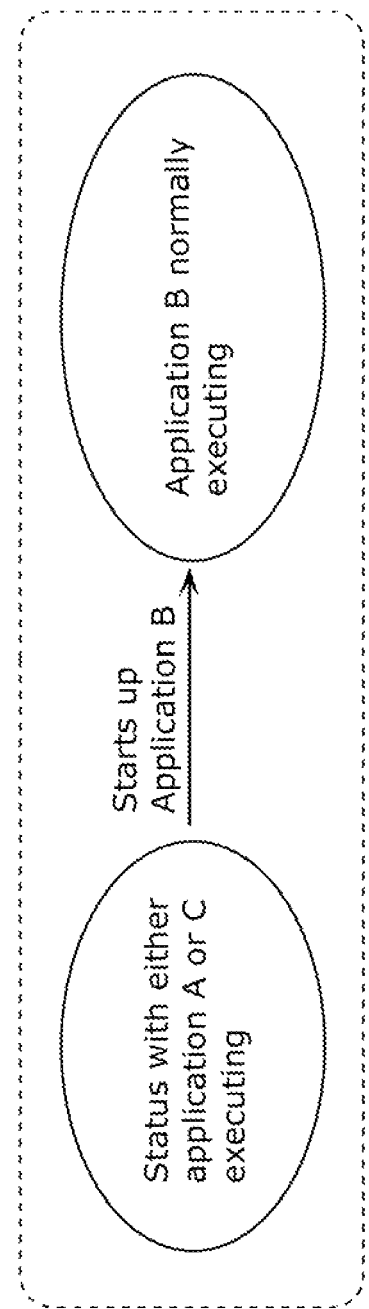
FIG. 14B exemplifies the application execution control by the unauthorized-cooperation-of-applications control unit according to Embodiment 1 of the present invention.

FIGS. 14A and 14B exemplify application execution control by the unauthorized-cooperation-of-applications control unit 220 according to Embodiment 1 of the present invention.

FIG. 14A shows the following case of a multitasking status: The access-history map 281 is shown as FIG. 13 (State 4 in FIG. 12); the only applications currently executing are the application A process 101 and the application C process 103; and the application B process 102, the application D process 104, and the application E process 105 are closed.

Here, suppose the application B process 102 is to start up. In the case where the application B process 102 starts up, the unauthorized-cooperation-of-applications control unit 220 determines that there is a potential risk of personal information leakage since the multitasking status becomes {the application A process 101-application B process 102-application C process 103}. Then, the unauthorized-cooperation-of-applications control unit 220 controls the startup of the application B process 102 according to the application execution control setting information 231.

FIG. 14B shows the following case: The access-history map 281 is shown as FIG. 13 (State 4 in FIG. 12), and the currently executing application is either the application A process 101 or the application C process 103. Here, suppose the application B process 102 is about to start up. Even though the application B process 102 starts up, the unauthorized-cooperation-of-applications control unit 220 determines that the multitasking status of {the application A process 101-application B process 102-the application C process 103}, which causes a potential risk of a personal information leakage via the external network, does not occur. Thus, the process control unit 200 starts up the application B process 102.

That ends the description of Embodiment 1.

The above feature allows that, when the pattern information used to determine unauthorized cooperation by malware is updated, the update is executed not by an external server but by generating the access-history map 281 in the terminal based on an access relationship among the applications. Such a feature makes it possible to certainly prevent an unauthorized cooperation of the applications for a personal information leakage via the external network.

Specifically, the information processing terminal 40 according to Embodiment 1 of the present invention holds in itself the access-history map 281 representing history information of an access relationship among the applications. With reference to the access-history map 281 and the application authorizing list 271, the information processing terminal 40 successfully detects an unauthorized cooperation found among the applications and directed at sensitive information such as personal information. Moreover, the access-history map 281, referred for the determination to show whether or not an unauthorized cooperation is established, is updated when a request is made to start up an application in the information processing terminal 40 and to establish inter-process communication; that is cooperation among applications. This operation eliminates the need for conventional update by a server of a pattern file of malware, and makes it possible to detect an unauthorized cooperation directed at a newly-downloaded application.

Hence, for a newly-installed application, the information processing terminal 40 successfully prevents an unauthorized cooperation among applications which causes a leakage of sensitive information such as personal information.

Moreover, the information processing terminal 40 successfully detects an unauthorized cooperation which causes a leakage of sensitive information such as personal information to an external communications network. Consequently, the information processing terminal 40 can prevent an unauthorized cooperation, among applications, which causes a leakage of sensitive information such as personal information via the external communications network.

Furthermore, after detecting the unauthorized cooperation among the applications, the information processing terminal 40 avoids starting up at least one of the applications. This operation contributes to prevention of an unauthorized cooperation. In addition, after detecting the unauthorized cooperation among the applications, the information processing terminal 40 terminates the connection to the external network. This operation contributes to prevention of a leakage of personal information via the external network. Moreover, after detecting the unauthorized cooperation among the applications, the information processing terminal 40 continues to close the applications until the multitasking status causes no unauthorized cooperation. This operation successfully prevents sensitive information such as personal information from leaking out by an unauthorized cooperation. Furthermore, the information processing terminal 40 uninstalls an application which is involved in an unauthorized cooperation. This operation successfully prevents sensitive information such as personal information from leaking out by an unauthorized cooperation.

In addition, in the case where there is a possible unauthorized cooperation, the user receives information indicating a potential risk of the unauthorized cooperation. This feature allows the user himself or herself to control the startup of an application.

Embodiment 2

Described next is an information processing terminal according Embodiment 2 of the present invention.

Embodiment 1 involves specifying, with reference to the access-history map 281 and the application authorizing list 271, a multitasking status which causes a potential risk of a leakage of sensitive information such as personal information via an external network. It is not efficient, however, to execute the specification for each execution of an application or for each access of inter-process communication. Embodiment 2 involves storing, as an unauthorized cooperation pattern, a multitasking status specified to cause a potential risk of a leakage of sensitive information such as personal information via the external network. Thus, Embodiment 2 achieves faster specification processing executed for each execution of an application or each access of inter-process communication. Most of the processing is similar to that in Embodiment 1. Described is different processing from that in Embodiment 1, and the detailed description of the processing in Embodiment 2 shall be omitted.

Figure 15:
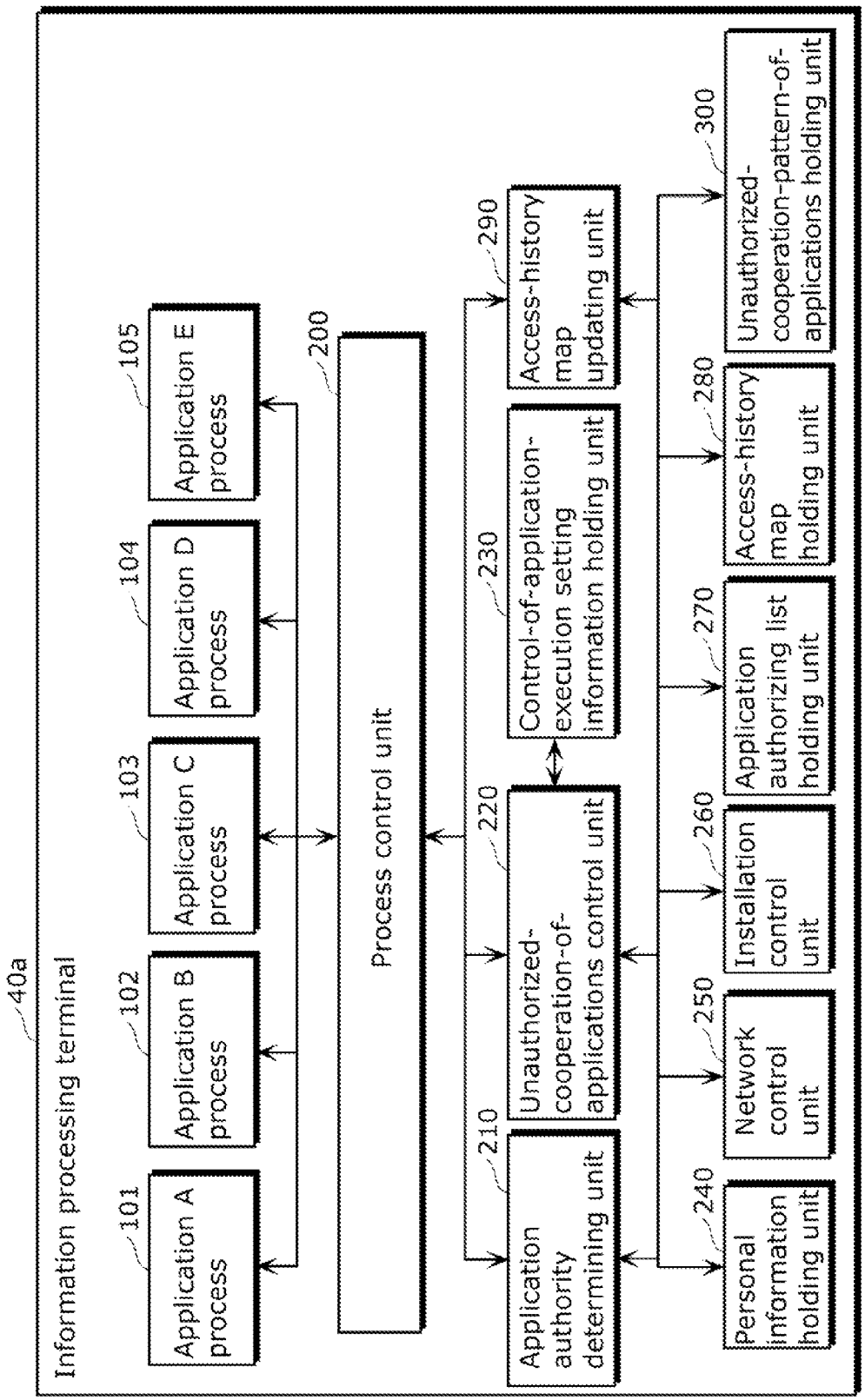
FIG. 15 illustrates a block diagram of an information processing terminal 40 according to Embodiment 2 of the present invention.

FIG. 15 illustrates a block diagram of an information processing terminal 40a according to Embodiment 2 of the present invention.

The difference between Embodiment 2 and Embodiment 1 is that the information processing terminal 40a in Embodiment 2 additionally includes an application-unauthorized-cooperation pattern holding unit 300. The application-unauthorized-cooperation pattern holding unit 300 is a data storage area in a memory holding an application-unauthorized-cooperation pattern 301. The application-unauthorized-cooperation pattern 301 shall be described with reference to FIG. 16.

Figure 16:
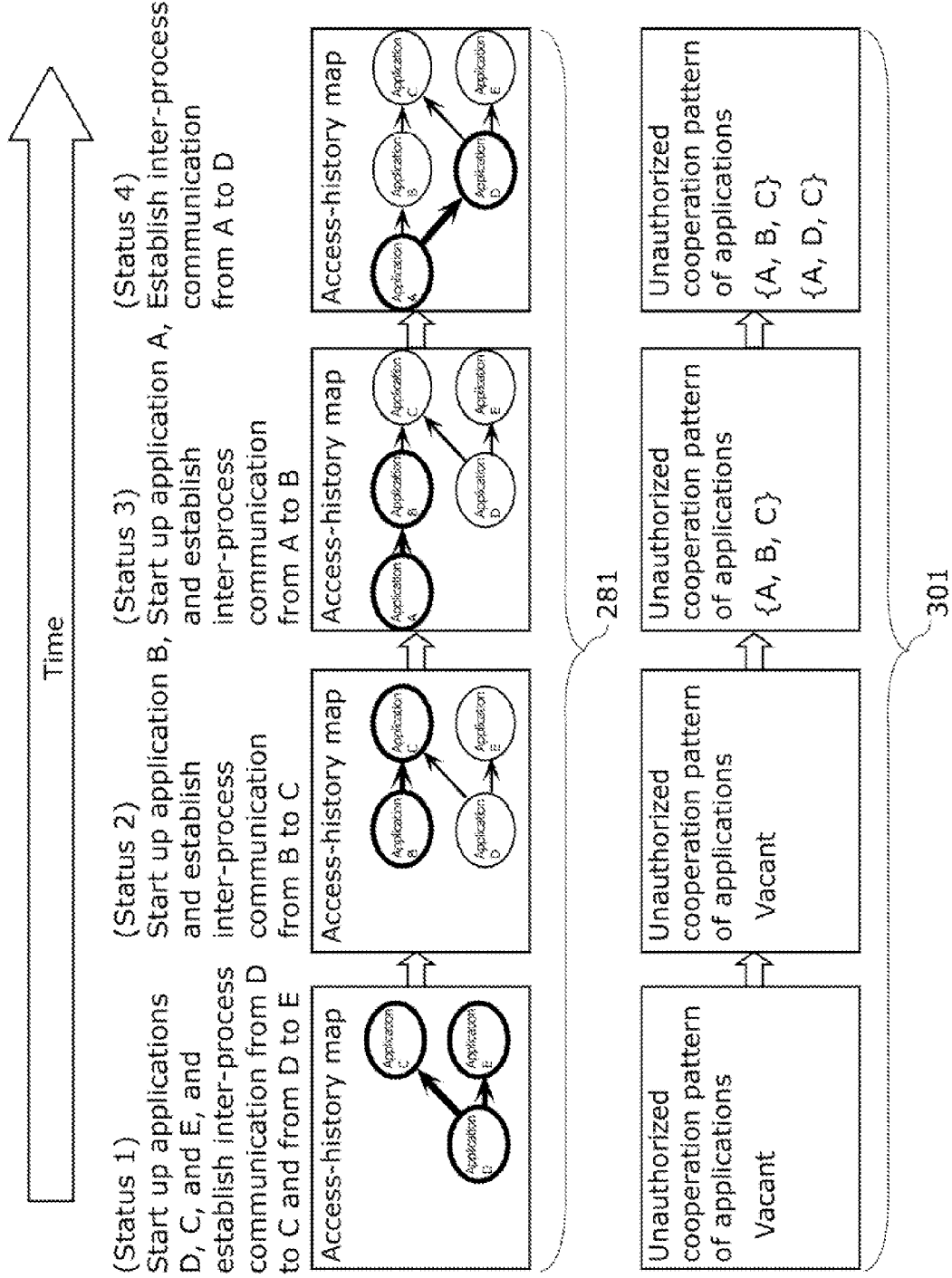
FIG. 16 illustrates an application-unauthorized-cooperation pattern according to Embodiment 2 of the present invention.

FIG. 16 illustrates the application-unauthorized-cooperation pattern 301 according to Embodiment 2 of the present invention. Specifically, FIG. 16 illustrates how the application-unauthorized-cooperation pattern 301 held in the application-unauthorized-cooperation pattern holding unit 300 transits along with the progress in access of applications. How the access of the applications progresses shall be described as similar access illustrated in FIG. 12.

The application-unauthorized-cooperation pattern 301 is information showing an execution status of applications which causes a potential risk of an unauthorized cooperation. Specifically, the application-unauthorized-cooperation pattern 301 is a group of information showing, as a pattern of a group of application IDs, a pattern of a multitasking status which causes a potential risk of a leakage of sensitive information such as personal information via an external network.

First, in Status 1 and Status 2, the application-unauthorized-cooperation pattern 301 has no accessing path which causes a potential risk of a leakage of sensitive information such as personal information via an external network. Thus, the application-unauthorized-cooperation pattern 301 is "vacant" (indicating no information).

In Status 3, in the case where multitasking is utilized to start up an application on the accessing path from the application A process 101 to the application C process 103, there develops the potential risk of a leakage of sensitive information such as personal information via the external network. Thus, the application-unauthorized-cooperation pattern 301 has applications IDs {A, B, C} recorded.

State 4 shows that, in addition to State 3, the multitasking status of {the application A process 101-the application D process 104-the application C process 103} causes the potential risk of the leakage of sensitive information such as personal information via the external network. Thus, in addition to the application IDs {A, B, and C}, the application IDs {A, D, and C} are added to the application-unauthorized-cooperation pattern 301. It is noted that the access-history map updating unit 290 updates the application-unauthorized-cooperation pattern 301 to a new unauthorized cooperation pattern.

Figure 17:
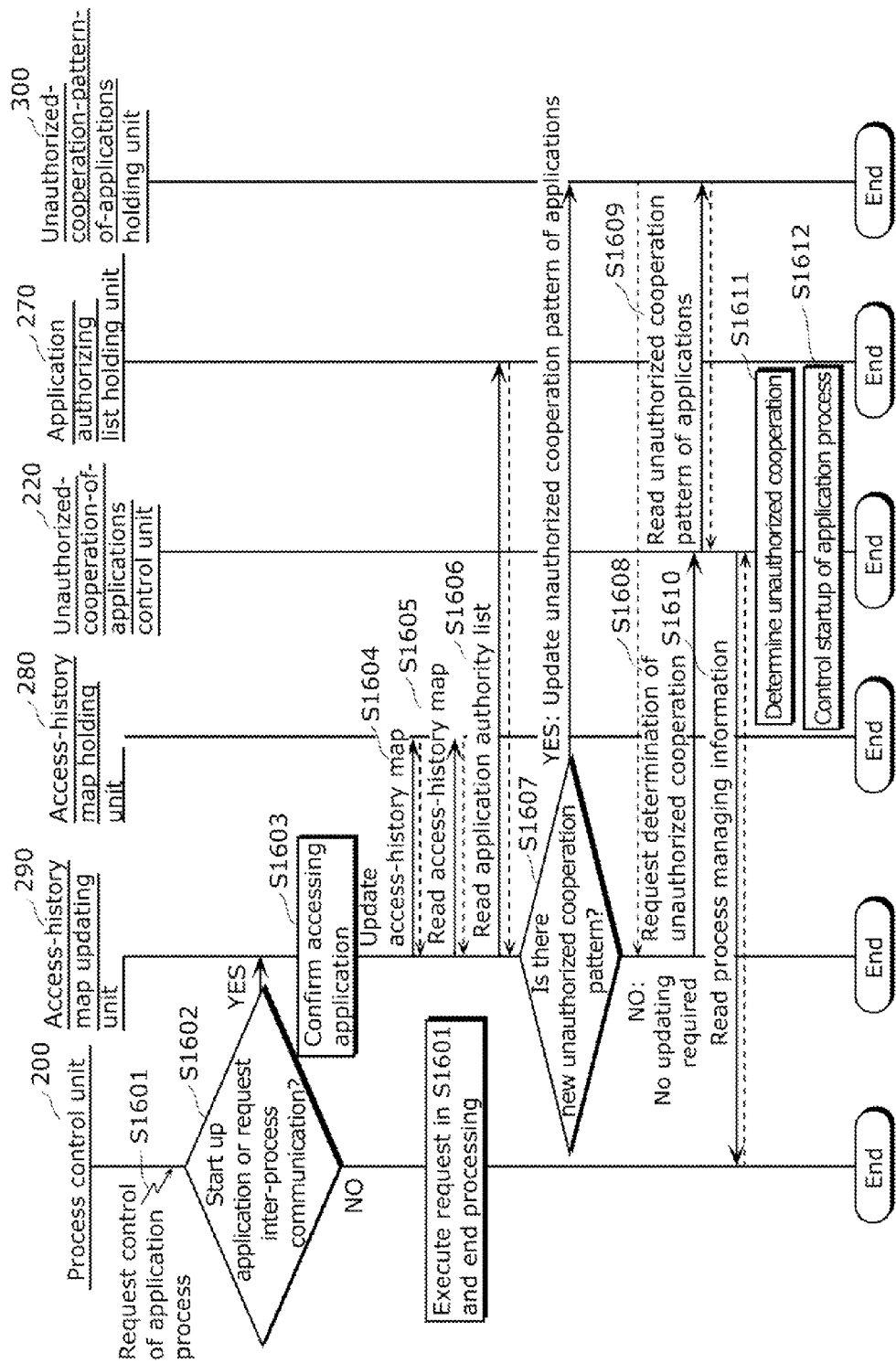
FIG. 17 depicts a sequential diagram showing a process from update of an access-history map and of an application-unauthorized-cooperation pattern by an access-history map updating unit to determination of unauthorized corporation by an unauthorized-cooperation-of-applications control unit according to Embodiment 2 of the present invention.

Described next with reference to FIG. 17 is how the access-history map updating unit 290 updates the application-unauthorized-cooperation pattern 301 held in the application-unauthorized-cooperation pattern holding unit 300.

FIG. 17 depicts a sequential diagram showing a process from update of the access-history map 281 and of the application-unauthorized-cooperation pattern 301 by the access-history map updating unit 290 to determination of unauthorized corporation by the unauthorized-cooperation-of-applications control unit 220 according to Embodiment 2 of the present invention.

The steps S1601 through S1604 are similar to the steps S801 through S804 in FIG. 8. Thus, the description thereof shall be omitted.

Next, the access-history map updating unit 290 reads the access-history map 281 from the access-history map holding unit 280 (S1605).

Then, the access-history map updating unit 290 reads the application authorizing list 271 from the application authorizing list holding unit 270 (S1606).

Next, the access-history map updating unit 290 determines whether or not there is a new unauthorized cooperation pattern which causes a risk of a leakage of sensitive information such as personal information via an external network (S1607).

In the case where the determination result shows that there is the new unauthorized cooperation pattern (S1607: YES), the access-history map updating unit 290 adds the new unauthorized cooperation pattern to the application-unauthorized-cooperation pattern 301 held in the application-unauthorized-cooperation pattern holding unit 300 in order to update the application-unauthorized-cooperation pattern 301. In the case where the determination result shows that there is no new unauthorized cooperation pattern (S1607: NO), the access-history map updating unit 290 executes S1608.

Then, the access-history map updating unit 290 executes the processing requested in S1601 so as to request the unauthorized-cooperation-of-applications control unit 220 to determine whether or not an unauthorized cooperation is established pattern which involves a risk of the multitasking status that causes the risk of the leakage of the sensitive information such as personal information via the external network (S1608).

Next, upon receiving the request made in S1608, the unauthorized-cooperation-of-applications control unit 220 reads the application-unauthorized-cooperation pattern 301 held in the application-unauthorized-cooperation pattern holding unit 300 (S1609).

Then, the unauthorized-cooperation-of-applications control unit 220 reads the process managing information 201 from the process control unit 200 (S1610).

Next, with reference to the application-unauthorized-cooperation pattern 301 and the process managing information 201, the unauthorized-cooperation-of-applications control unit 220 executes the processing requested in S1601 to determine whether or not an unauthorized cooperation is established pattern which involves the multitasking status that causes the risk of the leakage of the sensitive information such as personal information via the external network (S1611).

In the case where the determination shows that an unauthorized cooperation is established, the unauthorized-cooperation-of-applications control unit 220 controls the startup of the application according to the application execution control setting information 231 held in the control-of-application-execution setting information holding unit 230 (S1612). The details of S1612 are similar to the processing in steps S811 through S816. Thus, the description thereof shall be omitted.

The above process makes it possible to determine an unauthorized cooperation among the applications more efficiently than the process shown in Embodiment 1. In other words, the above process achieves an efficient falsification check to be conducted to a shared library loaded among multiple processes.

This ends the description of Embodiment 2.

Hence, the information processing terminal 40a according to Embodiment 2 of the present invention separately holds (i) the application-unauthorized-cooperation pattern 301 showing information on a multitasking status of applications which cause an unauthorized cooperation and (ii) the access-history map 281 which is access-history information of the applications. This feature eliminates the need for the analysis of access-history map 281 in determining whether or not an unauthorized cooperation is established, which contributes to faster processing.

Even though it is not shown in the drawings, once the access-history map 281 and the application-unauthorized-cooperation pattern 301 are falsified, they are bypassed to avoid an unauthorized cooperation detection check. Thus, such information may receive integrity verification. For the integrity verification, well-known arts including a digital signature and a hash function may be used.

It is noted that the present invention is described according to Embodiment 2. As a matter of course, the present invention shall not be defined only to Embodiment 2.

Figure 18:
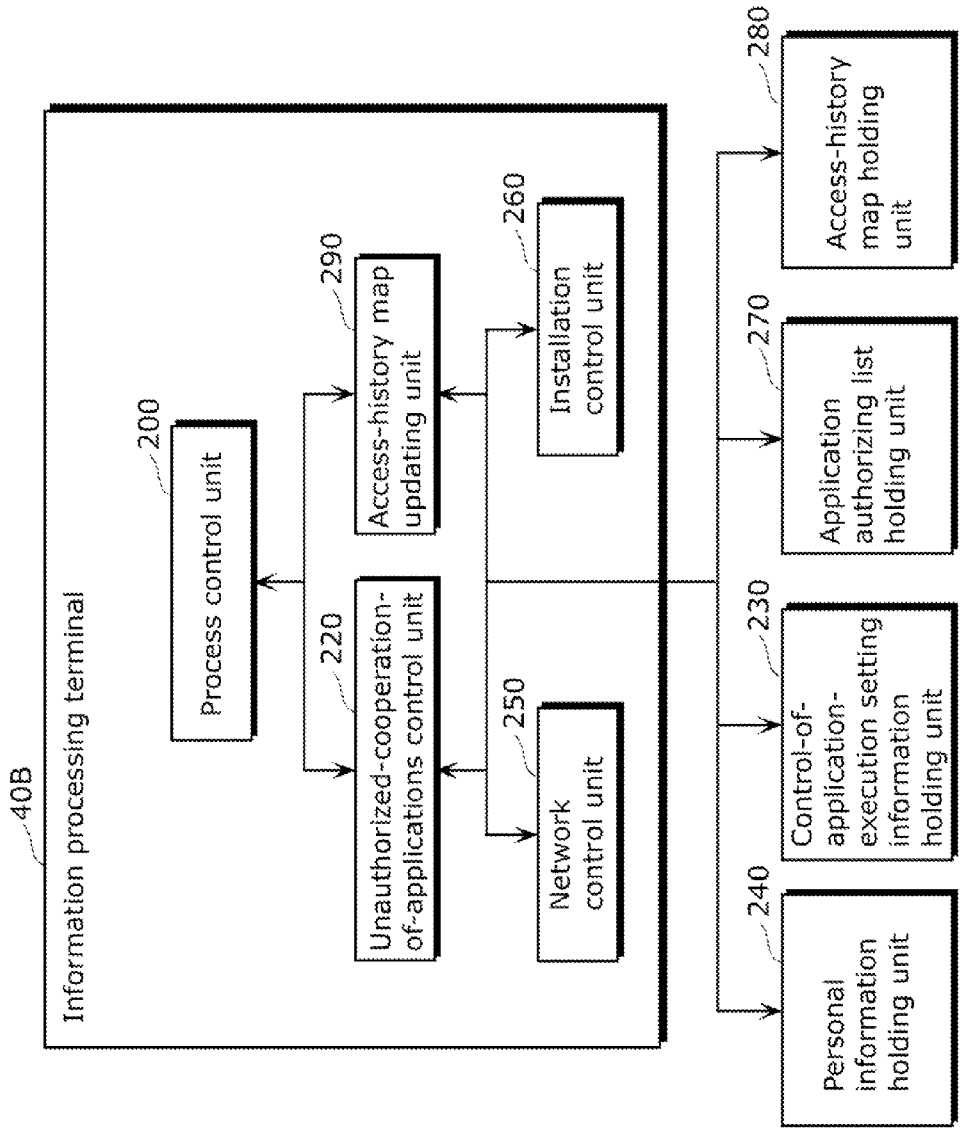
FIG. 18 shows a minimum structure of an information processing terminal according to the embodiments of the present invention.

For example, the information processing terminal may be structured as shown in FIG. 18. FIG. 18 shows a minimum structure of an information processing terminal according to Embodiment 2 of the present invention.

As shown in FIG. 18, specifically, the information processing terminal 40b includes the process control unit 200, the unauthorized-cooperation-of-applications control unit 220, the network control unit 250, the installation control unit 260, and access-history map updating unit 290. In other words, the information processing terminal 40b does not include the personal information holding unit 240, the control-of-application-execution setting information holding unit 230, the application authorizing list holding unit 270, and the access-history map holding unit 280. Such units may be included in an external memory, such as a secure digital (SD) card and a memory of a server connected via a communications network.

Here, the information processing terminal 40b causes the holding units in the external memory to record the information, and obtains the information from the holding units. In other words, the installation control unit 260 installs applications, and the process control unit 200 starts the application and establishes cooperation among the applications.

When a request is made to startup the application or to establish cooperation among the applications, the access-history map updating unit 290 reads the access-history map 281 from the external memory, updates the access-history map 281 so that the updated access-history map is a map when the requested startup is executed or when the requested cooperation is established, and stores the updated results in the external memory.

Then, the unauthorized-cooperation-of-applications control unit 220 reads from the external memory the latest access-history map 281 and application authorizing list 271, and determines whether or not an unauthorized cooperation, which is directed at sensitive information, is established among the applications. In the case where the determination result shows that the unauthorized cooperation is established, the unauthorized-cooperation-of-applications control unit 220 reads from the external memory the application execution control setting information 231, and controls execution of the applications using the application execution control technique shown by the application execution control setting information 231.

In Embodiment 2, as well, the application-unauthorized-cooperation pattern holding unit 300 does not have to be included in the information processing terminal; instead, the application-unauthorized-cooperation pattern holding unit 300 may be included in an external memory, such as an SD card and a memory of a server connected via a communications network.

Moreover, the cases below are also included in the present invention.

(1) Each of the above units is, specifically, a computer system including a microprocessor, ROM, RAM, a hard disk unit, a display unit, a keyboard, and a mouse. The RAM or the hard disk unit stores a computer program. The units achieve their functions through the microprocessor's operation according to the computer program. Here, the computer program is configured by combining instruction codes indicating instructions for the computer.

(2) Part or all of the constituent elements constituting each of the units may be configured from a single System-LSI (Large-Scale Integration). For example, each of the constituent elements for the information processing terminal 40b shown in FIG. 18 may be included in an integrated circuit.

The System-LSI is a super-multi-function LSI manufactured by integrating constituent units on one chip, and is specifically a computer system configured by including a microprocessor, ROM, RAM, or by means of a similar device. The RAM stores a computer program. The System-LSI performs its functions through the microprocessor's operation according to the computer program.

Furthermore, each unit of the constituent elements configuring the respective units may be made as separate individual chips, or as a single chip to include a part or all thereof.

Furthermore, here, System-LSI is mentioned but there are instances where, due to a difference in the degree of integration, the designations IC, LSI, super LSI, and ultra LSI are used. Furthermore, the means for circuit integration is not limited to the LSI, and implementation in the form of a dedicated circuit or a general-purpose processor is also available. In addition, it is also acceptable to use a Field Programmable Gate Array (FPGA) that is programmable after the LSI has been manufactured, and a reconfigurable processor in which connections and settings of circuit cells within the LSI are reconfigurable.

Furthermore, if an integrated circuit technology that replaces the LSI appears thorough the progress in the semiconductor technology or an other derived technology, that technology can naturally be used to carry out integration of the constituent elements. Biotechnology can be applied to the integrated circuit technology.

(3) Part or all of the constituent elements constituting each of the units may be configured as an IC card which can be attached and detached from each unit or as a stand-alone module. The IC card or the module is a computer system configured from a microprocessor, ROM, and RAM. The IC card or the module may also be included in the aforementioned super-multi-function LSI. The IC card or the module achieves its function through the microprocessor's operation according to the computer program. The IC card or the module may also be implemented to be tamper-resistant.

(4) The present invention may include characteristic units included in the information processing terminal as steps, and may be implemented as a method for preventing an unauthorized cooperation of applications. The method prevents an unauthorized cooperation among applications. The present invention may be a computer program for implementing the above method, using a computer, and may also be a digital signal including the computer program.

Furthermore, the present invention may also be implemented by storing the computer program or the digital signal in a computer readable recording medium such as a flexible disc, a hard disk, a CD-ROM, an MO, a DVD, a DVD-ROM, a DVD-RAM, a BD (Blu-ray Disc), and a semiconductor memory. Furthermore, the present invention may also include the digital signal recorded in these recording media.

Furthermore, the present invention may also be implemented by the transmission of the aforementioned computer program or digital signal via a telecommunication line, a wireless or wired communication line, a network represented by the Internet, and data broadcast.

The present invention may also be a computer system including a microprocessor and a memory, in which the memory stores the aforementioned computer program and the microprocessor operates according to the computer program.

Furthermore, by transferring the program or the digital signal by recording onto the aforementioned recording media, or by transferring the program or digital signal via the aforementioned network, execution using another independent computer system is also made possible.

(5) Within the scope of the present invention, included is the combination of the constituent elements in the embodiments and in the modifications of the embodiments.

The disclosed embodiments are examples in all respects, and therefore shall not be defined as they are. The scope of invention shall be defined not by the above descriptions but by claims, and shall include all modifications which are equivalent to and within the scope of the claims.

INDUSTRIAL APPLICABILITY

The present invention provides an information processing terminal certainly prevents an unauthorized cooperation of applications which causes a leakage of sensitive information such as personal information. Instead of using an external server, the information processing terminal generates and updates, within the terminal itself, the pattern information based on an access relationship among applications in order to prevent the unauthorized cooperation of applications. Such prevention is also directed at a newly installed application. Since such a feature makes it possible to prevent the unauthorized cooperation of applications from leaking sensitive information such as personal information via an external network, the present invention is effective for an information processing terminal which runs, on multitasking, applications handling sensitive information such as personal information.

REFERENCE SIGNS LIST

10 Application distribution system
20 Application distribution server
21 Memory
30 Application developing apparatus
40, 40a, 40b, and 41 Information processing terminal
50 Application package
51 Application
52 Access authority information
53 Application signature list
54 Public key certificate
60 Communications network
101 Application A process
102 Application B process
103 Application C process
104 Application D process
105 Application E process
200 Process control unit
202 Process ID
203 Parent process ID
204 and 282 Application ID
210 Application authority determining unit
220 Unauthorized-cooperation-of-applications control unit
230 Control-of-application-execution setting information holding unit
231 Application execution control setting information
232 ON and OFF information
233 Control content
240 Personal information holding unit
250 Network control unit
260 Installation control unit
270 Application authorizing list holding unit
271 Application authorizing list
272 Install path
273 Access authority setting
280 Access-history map holding unit
281 Access-history map
283 Accessed application ID
290 Access-history map updating unit
300 Application-unauthorized-cooperation pattern holding unit
301 Application-unauthorized-cooperation pattern

The invention claimed is:

1. An information processing apparatus, comprising:
a network control unit configured to establish a connection to an external communications network;
an installation control unit configured to install a first application;
a process control unit configured to start up the first application and establish cooperation among a plurality of applications, the plurality of applications including the first application;
an access-history map updating unit configured to update an access-history map which represents history information on an access relationship among the plurality of applications when a request is made to start up the first application or to establish cooperation among the plurality of applications, so that the updated access-history map is a map when the requested startup is executed or when the requested cooperation is established; and
an unauthorized-cooperation-of-applications control unit configured to (i) determine whether or not an unauthorized cooperation, which is directed at sensitive information kept secret, is established among the plurality of applications with reference to information obtained from the access-history map and an application authorizing list which includes access authority information of the first application, and (ii) control execution of the first application using an application execution control technique for the unauthorized cooperation, which is directed at the sensitive information, found among the plurality of applications in the case where a result of the determination shows that the unauthorized cooperation is established.

2. The information processing apparatus according to claim 1,
wherein said unauthorized-cooperation-of-applications control unit is configured to determine whether or not the unauthorized cooperation is established, based on information obtained from the application authorizing list including access authority information representing an access right to personal information or confidential information.

3. The information processing apparatus according to claim 2,
wherein said unauthorized-cooperation-of-applications control unit is configured to determine whether or not the unauthorized cooperation is established, based on information obtained from the application authorizing list further including access authority information representing an access right to the external communications network.

4. The information processing apparatus according to claim 1,
wherein said unauthorized-cooperation-of-applications control unit is configured to (i) determine whether or not the unauthorized cooperation, which causes a leakage of the sensitive information via the external communications network, is established among the applications, and (ii) control execution of the applications based on control-of-application-execution setting information showing an application execution control technique which prevents the unauthorized-cooperation in the case where a result of the determination shows that the unauthorized cooperation is established.

5. The information processing apparatus according to claim 4,
wherein in the case where the determination result shows that the unauthorized cooperation is established, said unauthorized-cooperation-of-applications control unit is configured to avoid the requested starting up of the first application, using the application execution control technique shown in the control-of-application-execution setting information, based on the control-of-application-execution setting information showing an application execution control technique which avoids starting up the first application.

6. The information processing apparatus according to claim 4,
wherein in the case where the determination result shows that the unauthorized cooperation is established, said unauthorized-cooperation-of-applications control unit is configured to terminate the connection to the external communications network, using the application execution control technique shown in the control-of-application-execution setting information, based on the control-of-application-execution setting information showing an application execution control technique which terminates the connection to the external communications network.

7. The information processing apparatus according to claim 4,
wherein in the case where the determination result shows that the unauthorized cooperation is established, said unauthorized-cooperation-of-applications control unit is configured to close an executing application included in the plurality of applications, using the application execution control technique shown in the control-of-application-execution setting information, until the determination shows that the unauthorized cooperation is not established, based on the control-of-application-execution setting information showing an application execution control technique which closes the executing application until the unauthorized cooperation is not established.

8. The information processing apparatus according to claim 4,
wherein in the case where the determination result shows that the unauthorized cooperation is established, said unauthorized-cooperation-of-applications control unit is configured to uninstall the first application, using the application execution control technique shown in the control-of-application-execution setting information, based on the control-of-application-execution setting information showing an application execution control technique which uninstalls the first application.

9. The information processing apparatus according to claim 1,
wherein in the case where the determination result shows that the unauthorized cooperation is established, said unauthorized-cooperation-of-applications control unit is configured to notify a user of information showing a potential risk of the unauthorized cooperation.

10. The information processing apparatus according to claim 1,
wherein with further reference to the updated access-history map and the application authorizing list, said access-history map updating unit is configured to update an application-unauthorized-cooperation pattern showing an execution status of applications causing a potential risk of the unauthorized cooperation, and
with reference to the updated application-unauthorized-cooperation pattern, said unauthorized-cooperation-of-applications control unit is configured to determine whether or not the unauthorized cooperation is established among the applications causing the potential risk of the unauthorized cooperation.

11. The information processing apparatus according to claim 1, further comprising:
a sensitive information holding unit configured to hold the sensitive information;
an access-history map holding unit configured to hold the access-history map;
an application authorizing list holding unit configured to hold the application authorizing list; and
an application execution control setting information holding unit configured to hold application execution control setting information showing the technique of controlling execution of the plurality of applications for the unauthorized cooperation directed at the personal information among the plurality of applications,
wherein said access-history map updating unit is configured to update the access-history map held in said access-history map holding unit, and
said unauthorized-cooperation-of-applications control unit is configured to (i) determine, with reference to information obtained from the updated access-history map and the application authorizing list held in said application authorizing list holding unit, whether or not an unauthorized cooperation, which is directed at the sensitive information held in said sensitive information holding unit, is established among the plurality of applications and, and (ii) control execution of the plurality of applications, using an application execution control technique shown by the application execution control setting information held in said application execution control setting information holding unit, in the case where a result of the determination shows that the unauthorized cooperation is established.

12. A method for preventing unauthorized cooperation of a plurality of applications, said method comprising:

installing a first application;

starting up the plurality of applications and establishing cooperation among the plurality of applications, the plurality of applications including the first application;

updating an access-history map which represents history information on an access relationship among the plurality of applications when a request is made to start up the first application or to establish cooperation among the plurality of applications, so that the updated access-history map is a map when the requested startup is executed or when the requested cooperation is established;

determining whether or not an unauthorized cooperation, which is directed at sensitive information kept secret, is established among the plurality of applications with reference to information obtained from the access-history map and an application authorizing list which includes access authority information of the first application; and controlling execution of the first application using an application execution control technique for the unauthorized cooperation, which is directed at the sensitive information, found among the plurality of applications in the case where a result of the determination shows that the unauthorized cooperation is established.

13. A non-transitory computer-readable recording medium having stored thereon a program for causing a computer to execute a method for preventing unauthorized cooperation of a plurality of applications, the method comprising:

installing a first application;

starting up the plurality of applications and establishing cooperation among the plurality of applications, the plurality of applications including the first application;

updating an access-history map which represents history information on an access relationship among the plurality of applications when a request is made to start up the first application or to establish cooperation among the plurality of applications, so that the updated access-history map is a map when the requested startup is executed or when the requested cooperation is established;

determining whether or not an unauthorized cooperation, which is directed at sensitive information kept secret, is established among the plurality of applications with reference to information obtained from the access-history map and an application authorizing list which includes access authority information of the first application; and controlling execution of the first application using an application execution control technique for the unauthorized cooperation, which is directed at the sensitive information, found among the plurality of applications in the case where a result of the determination shows that the unauthorized cooperation is established.

14. An integrated circuit, comprising:

a network control unit configured to establish a connection to an external communications network;

an installation control unit configured to install a first application;

a process control unit configured to start up the first application and establish cooperation among a plurality of applications, the plurality of applications including the first application;

an access-history map updating unit configured to update an access-history map which represents history information on an access relationship among the plurality of applications when a request is made to start up the first application or to establish cooperation among the plurality of applications, so that the updated access-history map is a map when the requested startup is executed or when the requested cooperation is established; and an unauthorized-cooperation-of-applications control unit configured to (i) determine whether or not an unauthorized cooperation, which is directed at sensitive information kept secret, is established among the plurality of applications with reference to information obtained from the access-history map and an application authorizing list which includes access authority information of the first application, and (ii) control execution of the first application using an application execution control technique for the unauthorized cooperation, which is directed at the sensitive information, found among the plurality of applications in the case where a result of the determination shows that the unauthorized cooperation is established.

* * * * *

UNITED STATES PATENT AND TRADEMARK OFFICE
CERTIFICATE OF CORRECTION

| | | |
|---|---|---|
| PATENT NO. | : 8,566,937 B2 | Page 1 of 1 |
| APPLICATION NO. | : 13/511803 | |
| DATED | : October 22, 2013 | |
| INVENTOR(S) | : Tomoyuki Haga | |

It is certified that error appears in the above-identified patent and that said Letters Patent is hereby corrected as shown below:

On the Title Page

In item (56), References Cited, under Foreign Patent documents, please correct the printed date of "12/2005" of EP 1 699 854 with -- 6/2006 --.

Signed and Sealed this
Twenty-eighth Day of January, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,566,937 B2  
APPLICATION NO. : 13/511803  
DATED : October 22, 2013  
INVENTOR(S) : Tomoyuki Haga Page 1 of 1

It is certified that error appears in the above-identified patent and that said Letters Patent is hereby corrected as shown below:

On the Title Page

In item (56), References Cited, under Foreign Patent documents, please correct the printed date of "12/2005" of EP 1 669 854 with -- 6/2006 --.

This certificate supersedes the Certificate of Correction issued January 28, 2014.

Signed and Sealed this  
Thirteenth Day of May, 2014

Michelle K. Lee  
*Deputy Director of the United States Patent and Trademark Office*